March 25, 1930.  C. H. GREEN  1,752,171
MULTIRECORD CONTROLLER
Filed Oct. 13, 1923  9 Sheets-Sheet 1

Inventor:
CLIFFORD H. GREEN

March 25, 1930. C. H. GREEN 1,752,171
MULTIRECORD CONTROLLER
Filed Oct. 13, 1923 9 Sheets-Sheet 2

Inventor:
CLIFFORD H. GREEN
By Jones, Addington, Ames & Seibold
Attys.

March 25, 1930.   C. H. GREEN   1,752,171
MULTIRECORD CONTROLLER
Filed Oct. 13, 1923   9 Sheets-Sheet 3
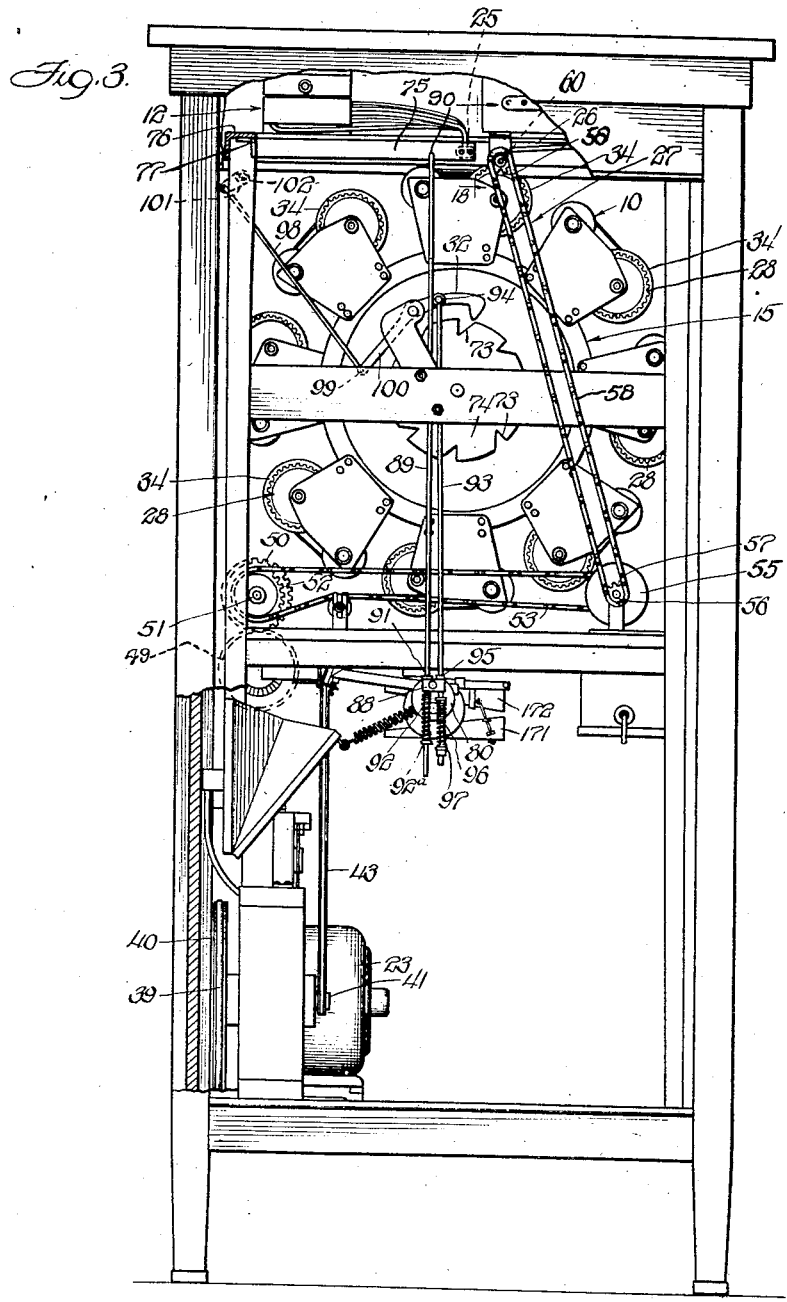
Inventor
CLIFFORD H. GREEN
By Jones, Addington, Ames & Seibold
Attys

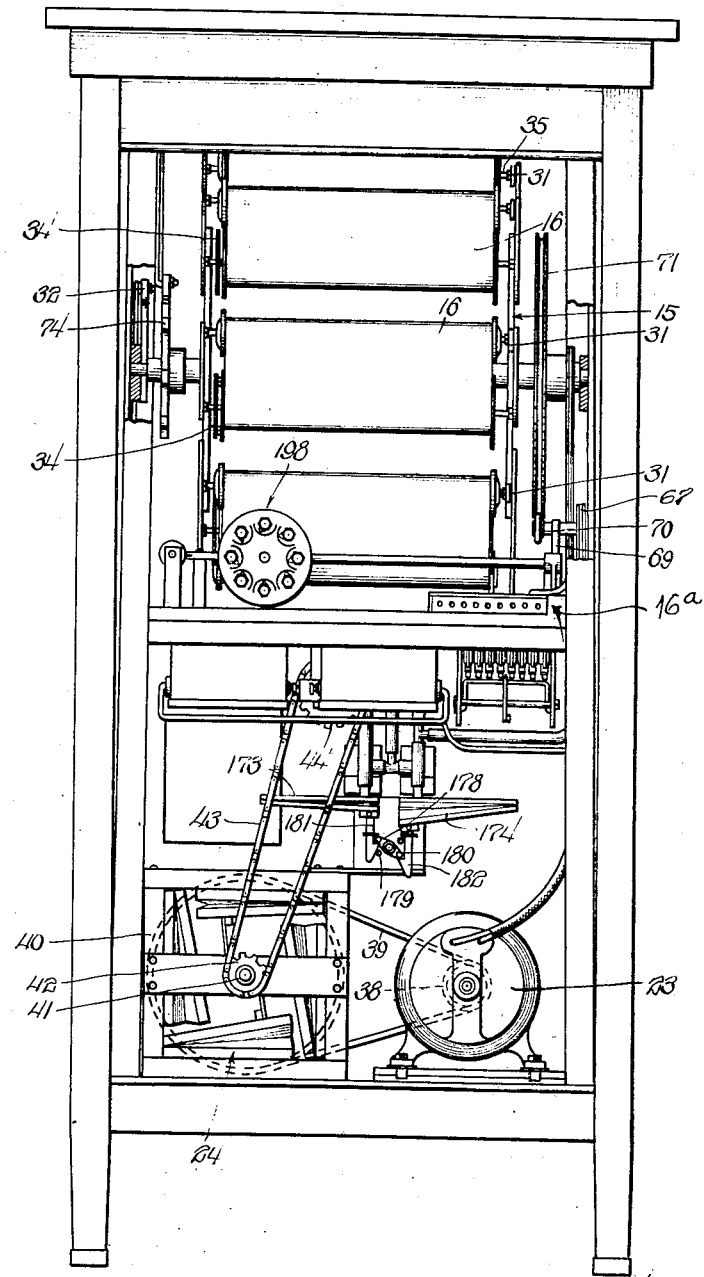

March 25, 1930.  C. H. GREEN  1,752,171
MULTIRECORD CONTROLLER
Filed Oct. 13, 1923  9 Sheets-Sheet 5
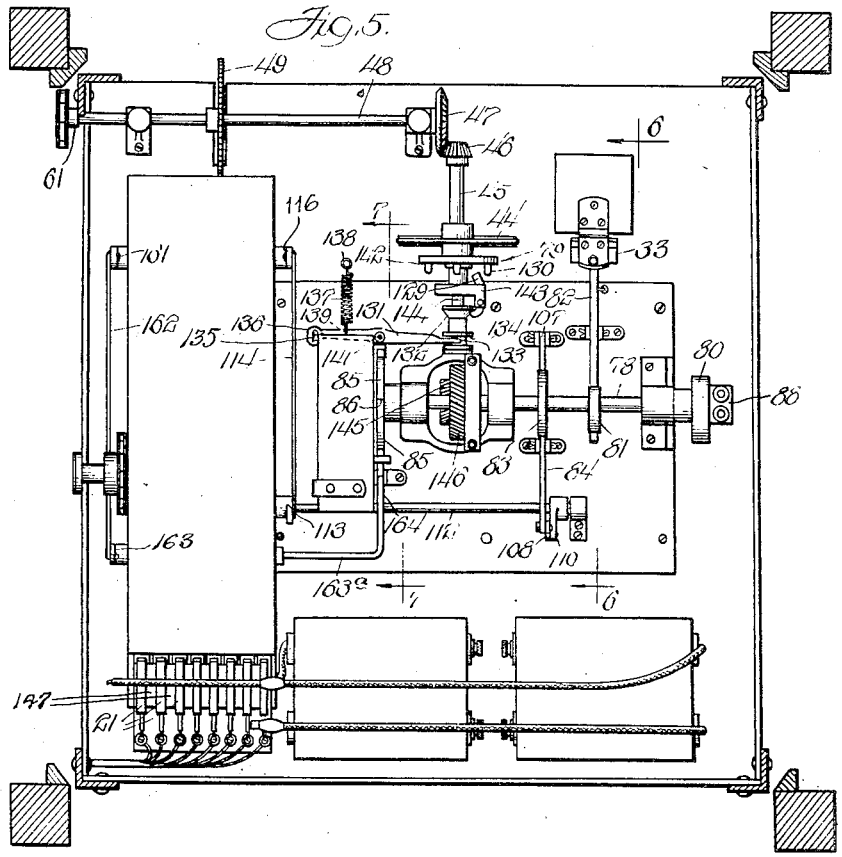
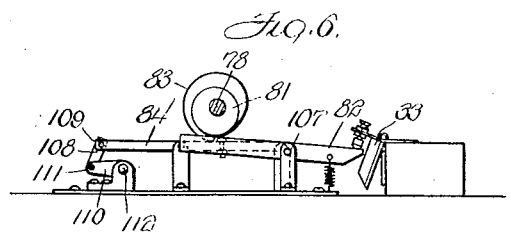
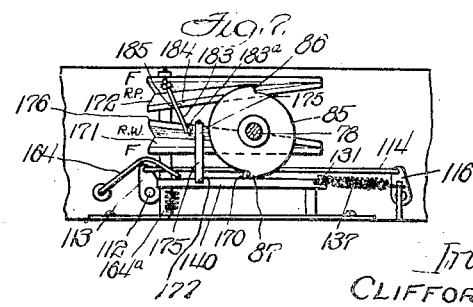
Inventor:
CLIFFORD H. GREEN.
By Jones, Addington, Ames & Seibold
Attys.

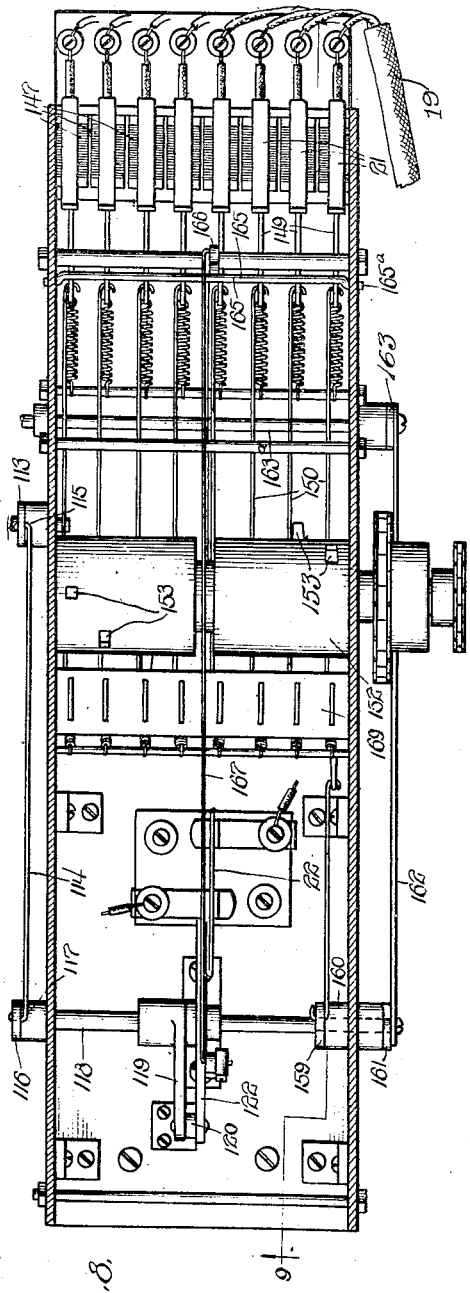

March 25, 1930.  C. H. GREEN  1,752,171
MULTIRECORD CONTROLLER
Filed Oct. 13, 1923   9 Sheets-Sheet 7

Inventor:
CLIFFORD H. GREEN
By Jones, Addington, Ames & Seibold
Attys.

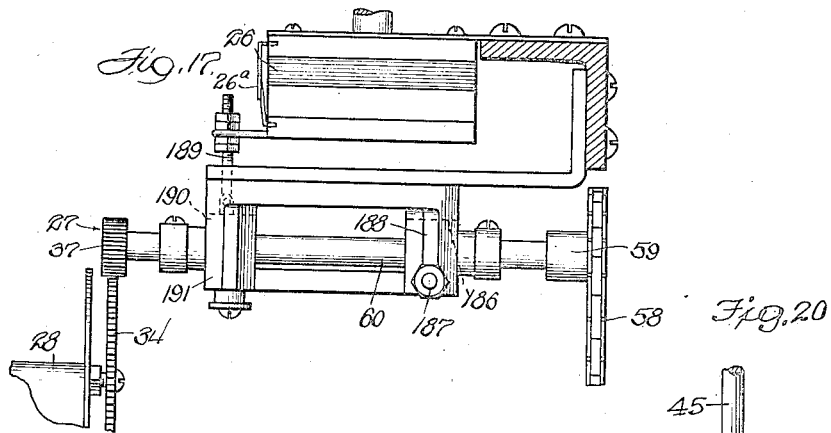
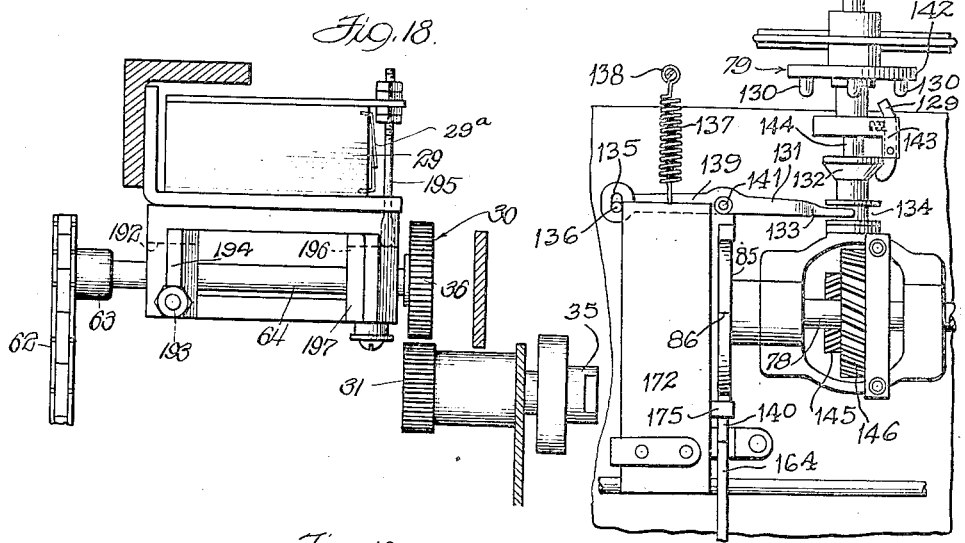
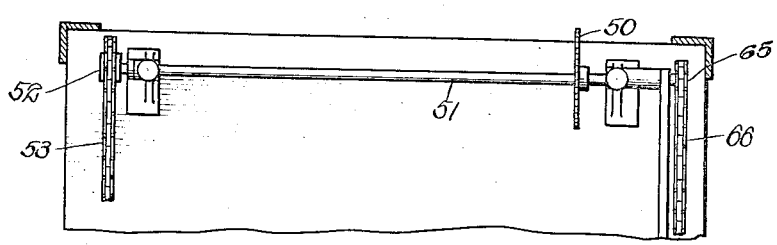

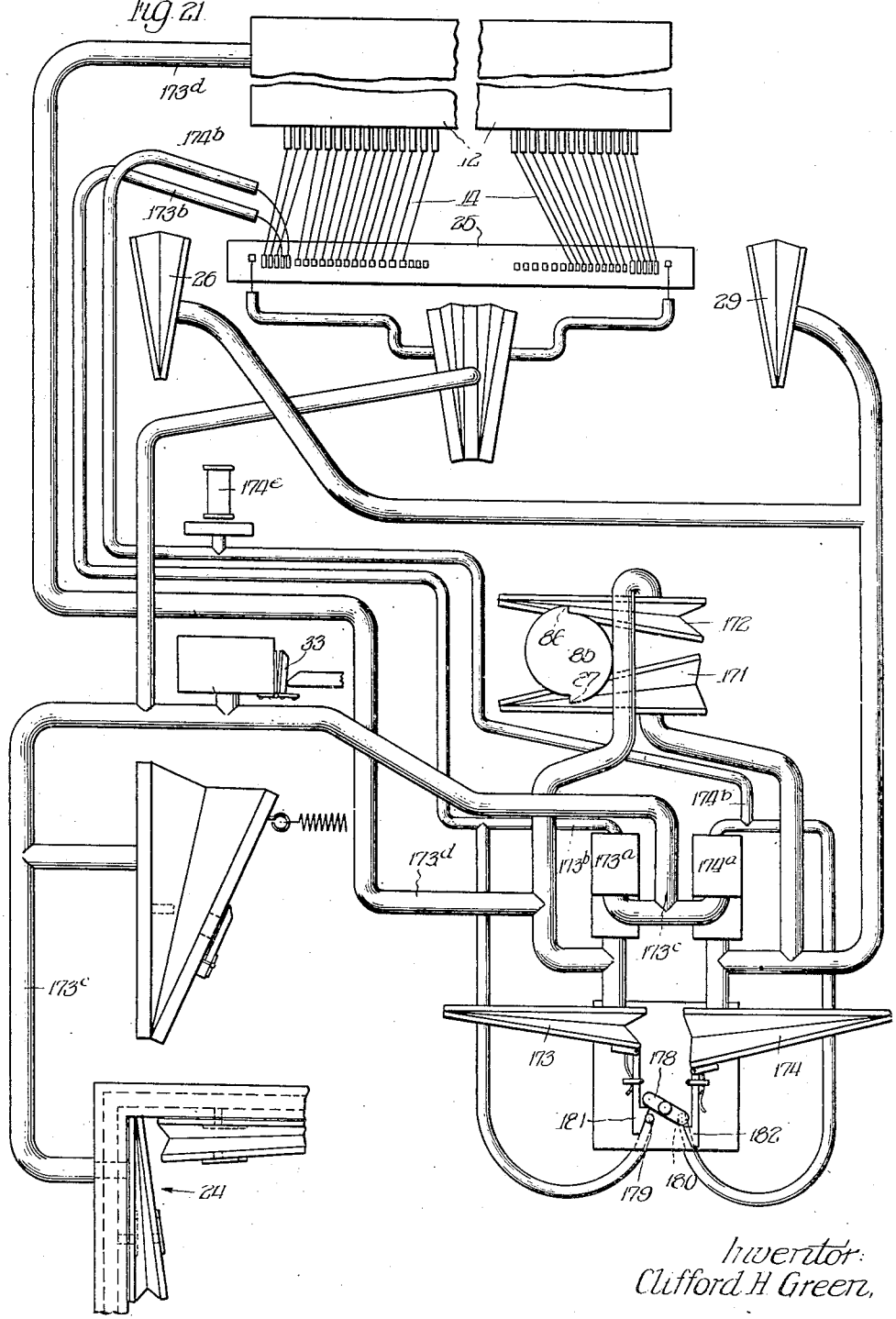

Patented Mar. 25, 1930

1,752,171

UNITED STATES PATENT OFFICE

CLIFFORD H. GREEN, OF GRAND RAPIDS, MICHIGAN, ASSIGNOR TO NATIONAL PIANO MFG. CO., OF GRAND RAPIDS, MICHIGAN, A CORPORATION OF ARIZONA

MULTIRECORD CONTROLLER

Application filed October 13, 1923. Serial No. 668,266.

My invention relates to multirecord controllers.

One of the objects of my invention is to provide a multirecord controller for an automatic musical instrument, which controller may be separate and remote from the musical instrument to be controlled, and by means of which any desired one of a plurality of music-rolls may be caused to be brought into operative relation to control the playing of the instrument.

Further objects will appear from the detailed description to follow and from the appended claims.

In the drawings, in which an embodiment of my invention is shown,—

Fig. 3 is an elevation of the other side of the controller;

Fig. 4 is a front elevation of the controller;

Fig. 5 is a section on the line 5—5 of Fig. 2;

Fig. 6 is a section on the line 6—6 of Fig. 5;

Fig. 7 is a section on the line 7—7 of Fig. 5;

Fig. 8 is a bottom view of a controller mechanism;

Fig. 9 is a section on the line 9—9 of Fig. 8;

Fig. 10 is a somewhat diagrammatic view of part of the magnet-rail;

Fig. 11 is a fragmentary sectional view of the pneumatic switchboard;

Fig. 12 is a section on the line 12—12 of Fig. 10;

Fig. 13 is a section on the line 13—13 of Fig. 11;

Fig. 17 is an enlarged view of the take-up spool drive;

Fig. 18 is an enlarged view of the rewind drive;

Fig. 19 is a detail view of part of the transmission;

Fig. 20 is an enlarged detail view of the clutch and a part of the clutch-controlling mechanism; and Fig. 21 is a schematic illustration of the pneumatic connections.

In order to give a general idea of what it is proposed to accomplish, before going into details of construction, it is stated that one way in which I have worked out the invention is to provide a remote controller equipped with a number of electric push-buttons, corresponding to the music-rolls which are placed in the magazine of the controller, the construction being such that, when a push-button corresponding to the desired selection is pressed, the controller will automatically cause this selection to be played upon the instrument.

I further provide means whereby any desired number of the push-buttons may be pressed, and (assuming that only one push-button has been pressed) the controller will thereupon cause the corresponding selections to be played, one after the other, each music-roll being rewound after it is played.

It may happen that anyone using the controller may decide, after starting the playing of a piece, that he does not care to have the piece played clear through, in which case I have provided means whereby, by simply pressing a push-button, the playing of this selection may be stopped and the music-roll rewound.

Figure 1:
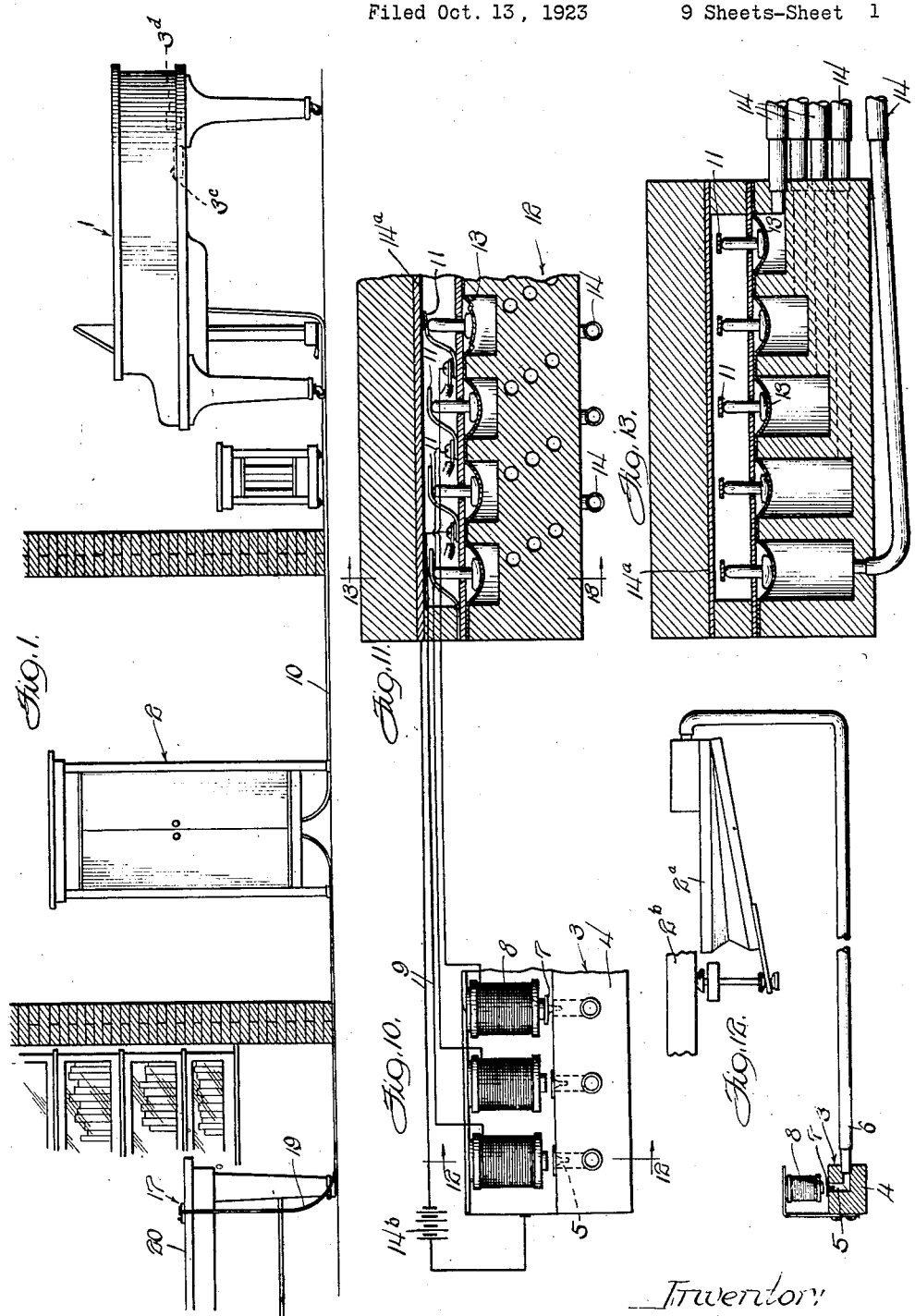
Figure 1 is a somewhat diagrammatic view showing an arrangement of control-board, controller, and musical instrument.

Referring now to the drawings in detail, the musical instrument 1 (Fig. 1), with which my controller 2 is used, is provided with the usual power-pneumatics 2ª (Fig. 12) for controlling the individual note-sounding action-units 2ᵇ, expression devices for controlling the playing intensities, etc., air-pump 3ᶜ, and air-pump motor 3ᵈ, but the selector mechanisms, including the magazine which carries the set of music-rolls, the tracker-bar and associated mechanism, are mounted as a unit, separate and distinct from the musical instrument, the only connection between the controller and the musical instrument being the cable carrying the electrical connections.

The musical instrument is provided with an electric control device, which I have called a magnet-rail 3, for controlling the power-pneumatics for the note-sounding devices and the various other pneumatics, such as those used in the expression mechanism, etc.

This magnet-rail (Figs. 10 and 12) comprises a bar 4 having a plurality of ports or openings 5 therein, corresponding in number to the pneumatics to be controlled and connected by tubes 6 with the control valves for such pneumatics, a plurality of magnetically operated valves 7, one for each of these openings, for controlling the admission of air thereto, and a plurality of electro-magnets 8, one for each of said valves, for controlling them.

These electro-magnets are connected by the wires 9 of the cable 10, referred to above, with the switches 11 of a pneumatic switchboard 12 (Figs. 11 and 13), forming part of the multirecord controller.

This pneumatic switchboard comprises a plurality of contact-makers or switches 11, one for each wire of the cable, and a plurality of pneumatic pouches or actuators 13, one for each of the electric switches referred to, these pouches being individually connected with the tracker-holes by means of the tracker-tubes 14.

As a music-roll travels over the tracker, the admission of air through the various perforations will cause the lifting of the selected pouches or actuators 13, which will cause the engagement of the corresponding switches or contact-makers 11 against the universal contact-bar 14$^a$, connected with the battery 14$^b$.

This engagement of the selected contact-makers 11 causes the energization of the corresponding magnets 8 on the remote magnet-rail, and hence the lifting of the corresponding magnetically operated valves 7.

This admits air to the respective tubes 6, thus causing the collapse of the corresponding power-pneumatics 2$^a$ and the actuation of the corresponding note-sounding devices 2$^b$, and also causing the collapse of the various other pneumatics, such as those used in the expression mechanism, etc.

As previously stated, in the construction shown, the player-piano 1 is provided with a motor and air-pump for furnishing wind for the pneumatic system of the instrument.

Any suitable connection may be provided for automatically starting and stopping the electric motor at the right time.

One arrangement for accomplishing this may be to connect this air-pump motor 3$^d$ in multiple with the electric motor 23 for the controller, so that the same switch which controls the controller motor will also control the air-pump motor for the musical instrument and so that both motors will be started and stopped at the same time.

I have shown the controller as comprising a movable carrier, in the form of a rotatable drum 15, having provisions for carrying eight music-rolls 16.

Figure 14:
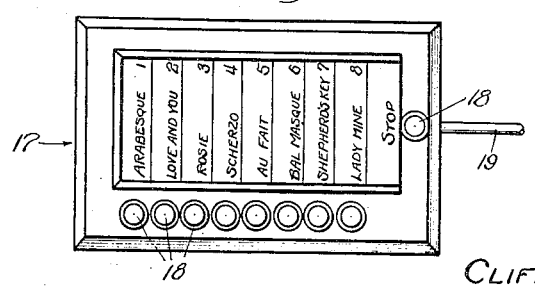
Fig. 14 is a plan view of the control-board.

The device by which the operator selects a desired roll may be worked out in different ways. It may be in the form of a plurality of push-buttons mounted either on the controller or piano, as shown, for example, at 16$^a$ (Fig. 4), or it may be in the form of a small, readily portable control-board 17 (Figs. 1 and 14), carrying the required number of push-buttons 18 and connected with the controller 2 only by the cable 19 carrying the necessary wires, so that the small portable control-board may be placed anywhere desired, as on a desk or table 20, and may be readily moved about from place to place.

It may assist in giving a general idea of the device, before going into details, to outline the operation thereof in a general way. Assuming that the operator wants to have a certain selection played, he presses the button, on the small control-board 17, corresponding to the desired selection. This releases the respective one of the eight magnetically operated armature-triggers 21 (Figs. 8 and 9), which permits the switch-blade 22 for the electric motor 23 to be thrown in to start the motor. The switch also controls the stopping and starting of the motor 3$^d$ which drives the air-pump 3$^c$ of the player-piano 1. The motor 23 drives the four-bellows vacuum-pump 24, which furnishes vacuum for the pneumatic switchboard 12 and for the various other pneumatic devices of the controller, and also causes the roll-carrying drum 15 to revolve until the desired roll is under the tracker, when the drum automatically stops, the swinging tracker 25 comes down on the selected music-roll, and the pneumatic 26 (Figs. 3 and 17), which controls the winding or playing movement of the music-roll, expands and brings the playing transmission 27 into operative relation with the take-up spool 28 of the selected music-roll, causing the music-roll to be drawn over the tracker to control the playing of the desired selection upon the remote musical instrument 1.

Figure 2:
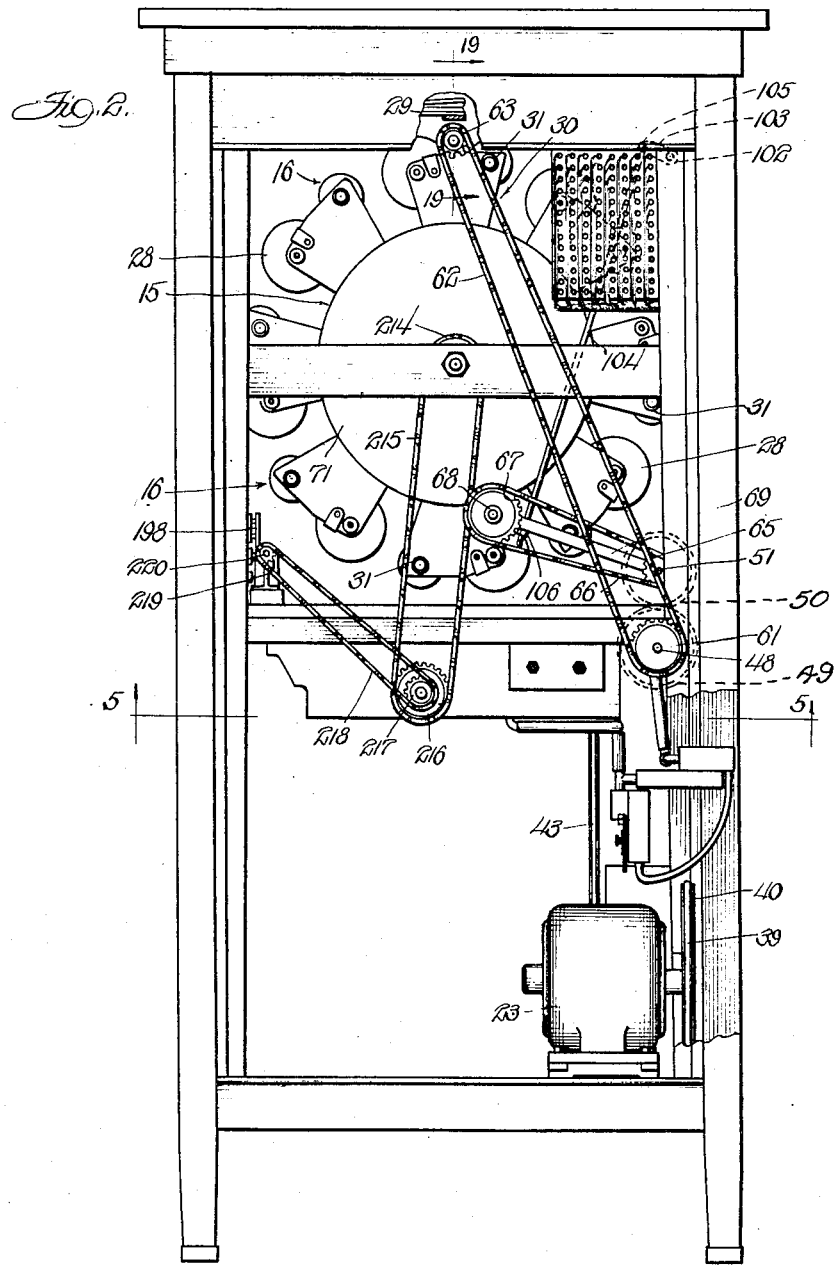
Fig. 2 is a side elevation of the controller.

At the end of the selection, the collapse of the rewind pneumatic 29 (Figs. 2 and 18) brings the rewinding transmission 30 into operative relation with the pinion 31, which rewinds the music-roll. The music-roll is thus rewound until the replay perforation uncovers the replay hole in the tracker 25, whereupon, by a system of control devices described in detail hereinafter, the tracker-bar 25 is raised from the music-roll, the drum-positioning latch 32 is released, the air inlet valve 33 is opened to break the vacuum created by the vacuum-pump, and the switch-blade 22, which controls the electric motors, is thrown out, thus stopping the operation of both the controller and the musical instrument.

Before describing the more intricate parts of the control mechanism, I will describe the simpler parts, such as the transmission from the motor to the vacuum-pump, and the winding and rewinding mechanism. The means for mounting the music-rolls for winding and rewinding movement may be of any suitable type and are not described in much detail. The drum is shown as provided with eight of these units. Each unit comprises a take-up roll 28 provided with a drive gear 34 (Figs. 3 and 17), and a drive spindle 35 (Figs. 4 and 18) for the music-spool, the spool spindle being provided with a rewind pinion 31 for engagement with the rewind gear 36.

The power-pneumatic 26 is provided for bringing the take-up drive pinion 37 into and out of mesh with the take-up roll gear 34, and the other power-pneumatic 29 is provided for bringing the music-spool rewind or reroll gear 36 into and out of mesh with the driven pinion 31 of the music-spool spindle.

Figure 15:
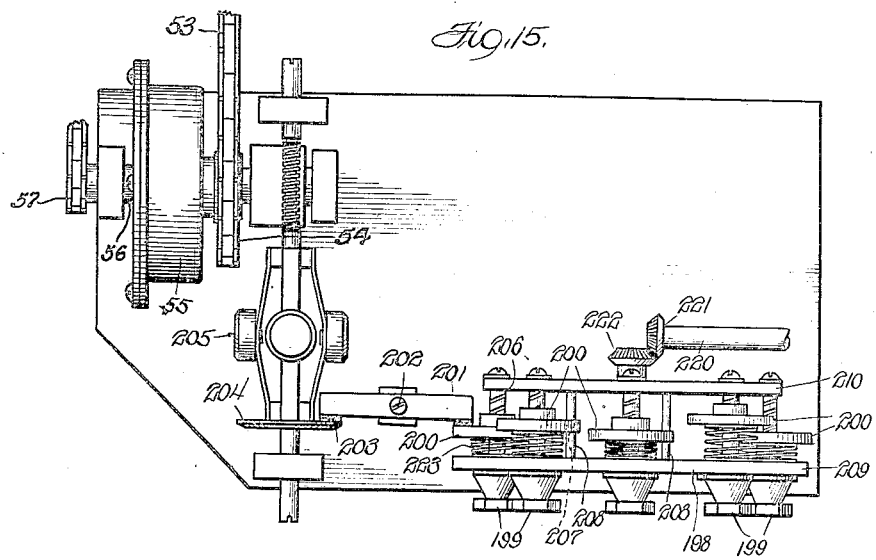
Fig. 15 is an enlarged plan view of the tempo controller.
Figure 16:
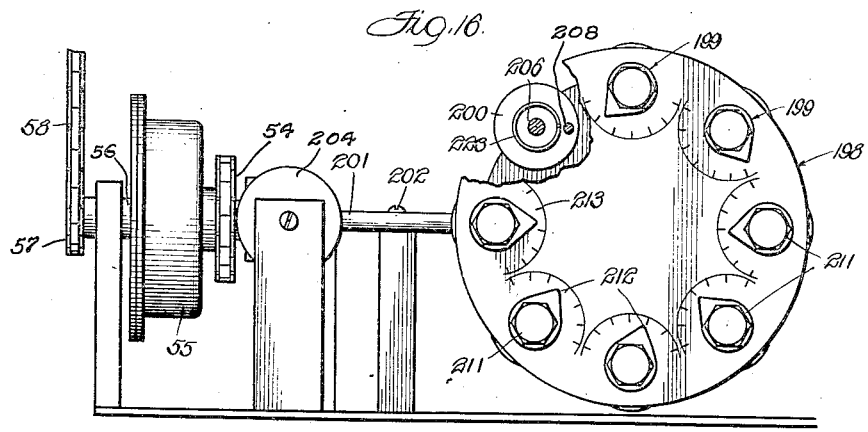
Fig. 16 is an enlarged elevation of the tempo controller.

The transmission from the electric motor 23 to the take-up drive pinion 37 comprises the motor-pulley 38, the belt 39 running over the motor-pulley, the large driven pump-pulley 40, the shaft 41 on which the pump-pulley is mounted, the sprocket 42 mounted on the shaft 41, the sprocket-chain 43 running over the sprocket 42, the sprocket 44 (Figs. 4 and 5) driven from the sprocket-chain 43, the shaft 45 on which the sprocket 44 is mounted, the bevel-pinion 46 mounted on the shaft 45, the bevel-gear 47 meshing with the bevel-pinion 46, the shaft 48 on which the bevel-gear 47 is mounted, the spur-gear 49 mounted on the shaft 48, the spur-gear 50 (Figs. 3 and 19) meshing with the spur-gear 49, the shaft 51 on which the spur-gear 50 is mounted, the sprocket 52 mounted on the shaft 51, the sprocket-chain 53 (Figs. 3, 15 and 19) running over the sprocket 52, the sprocket 54 driven by the sprocket-chain 53, the variable speed transmission 55 between the sprocket 54 and the shaft 56, the sprocket 57 mounted on the shaft 56, the sprocket-chain 58 running over the sprocket 57, the sprocket 59 driven by the sprocket-chain 58, and the shaft 60 on which the sprocket 59 is mounted and on which the take-up drive pinion 37 also is mounted.

The drive from the electric motor to the rewind pinion 31 comprises that part of the take-up spool drive heretofore described, up to the shaft 48 and, in addition, includes the sprocket 61 (Figs. 2 and 5) mounted on the shaft 48, the sprocket-chain 62 (Figs. 2 and 18) running over the sprocket 61, the sprocket 63 driven by the sprocket-chain 62, and the shaft 64 on which the sprocket 63 is mounted and on which the rewind drive gear 36 also is mounted.

It will be noted that the take-up spool drive pinion is normally held in meshing position by a spring 26ª and is pulled out of meshing position by the collapse of its pneumatic 26, and that the arrangement for the rewind drive gear is just the opposite, that is, it is normally held out of meshing position by a spring 29ª and is pulled into meshing position by the collapse of its pneumatic 29. This enables the two pneumatics 26 and 29 to be connected so as to operate together from the same control, the collapse of the pneumatics throwing the take-up pinion 37 out of mesh and the rewind gear 36 into mesh, and the expansion of the two pneumatics throwing the take-up pinion into mesh and the rewind gear out of mesh. The control for these two pneumatics will be described in detail later.

The transmission from the motor 23 to the music-roll carrying drum comprises, in addition to that part of the transmission from the electric motor up to the shaft 51, previously described, a sprocket 65 (Fig. 2) mounted on the shaft 51, a sprocket-chain 66 (Figs. 2 and 19) running over the sprocket 65, a sprocket 67 driven by the sprocket-chain 66, a short shaft 68 on which the sprocket 67 is mounted (mounted in the swinging arm 69), and a friction-wheel 70 (Fig. 4) mounted on the shaft 68 and frictionally engaging the large friction-wheel 71, which is secured to rotate with the drum 15. It may be noted, at this point, that the travel of the roll-carrying drum 15 is stopped by moving the swinging arm 69 so as to disengage the friction-wheel 70 from the large friction-wheel 71.

In order to definitely position the roll-carrying drum 15 with respect to the tracker 25 and associated mechanism, after the friction-wheel 70 has disengaged the large friction-wheel 71, a pivoted positioning latch 32 (Figs. 3 and 4) is provided which enters one of the positioning notches 73 in the positioning wheel 74, which rotates with the drum 15. The tracker-bar 25 is pivotally mounted to move into and out of engagement with the music-roll on a swinging frame 75, hinged to the main frame 76 at 77.

The movement of the tracker-bar 25, the movement of the positioning latch 32 into and out of engagement with the positioning wheel 74, and the movement of the friction drive wheel 70 into and out of engagement with the large driven friction-wheel 71, are all controlled by means of a two-position or "two-point" controller, to be described in detail later.

The most important units which remain to be described are the two-point controller referred to above, the pneumatic reverse control mechanism, the selective controller for controlling the motor switch and the clutch, and the tempo controller for individually determining the speed of travel of the several music-rolls. The two-point control device, the selective controller for the motor switch and the clutch, and the pneumatic reverse control mechanism are closely related and will be described together. The two-point controller controls the movement of the tracker-bar toward and from the music-roll, the movement of the positioning latch for the drum, the movement of the friction drive wheel for the drum, the air inlet valve for destroying the vacuum created by the pump 24, and the switch for the electric motor. In addition to this, it is also provided with a cam having a pair of clutch-disengaging shoulders or catches, whereby the two-point controller automatically disconnects itself from its driving member at each half-revolution.

In one position of the two-point controller, the tracker 25 is away from the drum, the positioning catch 32 is away from the notched positioning wheel, the air inlet valve 33 is open, and the switch-blade 22 is in "off" position (assuming that only one selector has been tripped).

In the other position of the two-point controller, the tracker 25 is in engagement with the music-roll, the positioning latch 32 engages the selected notch, the air inlet valve 33 is closed, and the motor switch-blade 22 is in "on" position.

This two-point controller (Figs. 5, 6, and 7) comprises a shaft 78 (connected through the clutch 79 with the shaft 45), a crank-disc 80 (Figs. 3 and 5) for controlling the position of the tracker 25, latch 32, and friction drive wheel 70, an eccentric or cam 81 for actuating the valve-controlling arm 82, a cam 83 for controlling the switch-actuating lever 84, and a cam 85 (Fig. 7) having a pair of oppositely disposed shoulders or catches 86 and 87, positioned 180° apart, for throwing out the clutch 79.

The transmission from the crank-disc 80 to the tracker 25 and latch 32 is made to include spring means, in order to prevent the transmission from being injured and in order that the positioning catch may snugly engage in the selected notch.

The transmission from the crank-disc to the tracker comprises crank-pin-block 88 (Fig. 3) swiveled on the disc, and a link or push-rod 89 having a limited sliding movement in the crank-pin-block 88 and pivotally connected at its upper end at 90 to the swinging tracker-frame 75.

The tracker 25 is moved away from the music-roll by the engagement of the crank-pin-block with the collar 91 secured to the push-rod 89. It is moved toward the music-roll by its own weight and by the spring pressure of the coil compression spring 92 acting between the crank-pin-block and the collar 92ᵃ on the push-rod.

The transmission from the crank-disc 80 to the positioning latch 32 is similar to that just described, comprising a push-rod 93 having a limited sliding movement in the crank-pin-block and pivotally connected at its upper end at 94 to the latch.

The latch is moved out of latching position by the engagement of the crank-pin-block with the collar 95 on the push-rod 93, and is moved into latching position by its own weight and the spring pressure of the spring 96 acting between the crank-pin-block and the collar 97 on the push-rod.

The movement of the friction drive wheel 70 toward and from the large driven friction-wheel 71 is effected from the positioning latch 32.

The transmission from this positioning latch to the pivoted arm which carries the friction drive wheel comprises a link 98 (Fig. 3) pivoted at 99 to the extension 100 of the latch, a rock-arm 101 pivotally connected to the rock-shaft 102 on which the rock-arm 101 is mounted, a rock-arm 103 (Fig. 2) secured on the rock-shaft 102, and a link 104 pivotally connected to the rock-arm at one end 105 and, at its other end 106, pivotally connected to the swinging arm 69.

The transmission from the switch-controlling cam 83 to the switch comprises the lever 84 engaged by the cam and pivoted at 107, a link 108 pivoted at one end 109 to the lever 84, a rock-arm 110 to which the other end 111 of the link is pivoted, a rock-shaft 112 on which the rock-arm 110 is mounted, a rock-arm 113 (Figs. 5 and 8) mounted on the rock-shaft 112, a link 114 pivotally connected at one end 115 to the rock-arm 113, a rock-arm 116 to which the other end 117 of the link is pivotally connected, a rock-shaft 118 (Figs. 8 and 9) on which the rock-arm 116 is mounted, a rock-arm 119 mounted on the shaft 118, a link 120 pivotally connected at one end 121 to the rock-arm, a lever 122 (pivoted at 122ᵃ) to which the other end 123 of the link 120 is pivotally connected, and a trigger-controlled switch-latch 124 pivotally mounted at 125 on the lever 122 and having a shoulder or catch-portion 126 for engagement with the lug 127 on the rear end of the switch-blade 22, which is pivotally mounted at 128.

The trigger control for the pivotally mounted switch-latch 124 will be described later.

Before describing the two-point controller-cam for the clutch, it will be well to describe in a general way the clutch itself. This clutch controls the drive between the shaft 45 and the two-point controller.

The clutch 79 (Figs. 5 and 20), between the shaft 45 and the two-point controller, is thrown out of engagement by the movement of the two-point controller itself, which is the driven member. In order that the clutch-members may be completely disengaged by the movement of the driven member, I find it necessary to provide a clutch in which a further final movement will be imparted to the driven member (the pivoted clutch-dog 129) of the clutch after it has moved out of driving relation with the driving member (the clutch-pins 130) of the clutch.

For this purpose, I provide a sort of floating lever or shifter 131 for the clutch-controlling cone 132, mounted so that, at three different stages of its movement, it moves about three different fulcrums. This floating lever 131 has a yoke 133 at one end, which engages the annular groove 134 in the slidable clutch-controlling cone, and has a slot 135 at its other end to receive the stationary pin 136, whereby a lost-motion engagement or shiftable pivot is provided for this end of the floating cone-shifting lever.

A coil tension-spring 137, fastened at one end to the screw 138 and at the other end 139 to the floating lever 131, is provided, which tends to pull the floating lever into position to permit engagement of the clutch-members, and a clutch-disengaging link 140 (see Fig. 7), the control of which will be described later, is pivotally connected at 141 to the floating lever for moving it to cause the clutch-controlling cone 132 to throw the pivoted driven clutch-dog 129 out of engagement with the driving clutch-pins 130 on the clutch-disc 142.

Assuming that the clutch-members 129 and 130 are disengaged and that the clutch-throwout link 140 is released, as hereinafter described, this will permit the coil tension-spring 137 to pull the yoke-end 133 of the lever over to shift the clutch-controlling cone 132 to permit the spring-pressed pivoted dog 129 (see Fig. 20) to move into the path of one of the clutch driving pins 130 mounted on the clutch-disc 142, which in turn is fixed on the drive shaft 45. The pins 130 will then drive the dog 129, which in turn drives the two-point controller, as hereinafter described.

Assuming now that the clutch-throw-out link 140 is engaged by one of the cam shoulders or catches 86 or 87 as the two-point controller-shaft 78 rotates, this will effect a three-stage movement of the clutch-controlling lever 131 about three different fulcrums. The first stage of movement of the floating lever will be about the yoke-end 133 of the lever as a fulcrum, because the driving pressure of the engaged driving pin 130 on the pivoted dog 129 will hold this pivoted dog 129 from slipping out of engagement with the driving pin against the force exerted by the tension-spring 137. This first stage of movement continues until the slotted end of the floating lever reaches the limit of its lost-motion connection with the pivot pin 136, whereupon the second stage of movement begins about this pivot-pin as an axis. This second stage of movement continues until the yoke-end 133 of the floating lever moves the clutch-cone 132 far enough to cause the pivoted spring-pressed dog 129 to move out of driven relationship with the driving pin. As soon as the pivoted dog is out of driven relationship, the third stage of movement of the floating lever takes place about the pivotal point of connection 141 between the floating lever and the clutch-throw-out link 140, due to the action of the tension-spring 137. This further final movement of the floating lever gives an additional movement to the clutch-controlling cone 132 and moves the pivoted dog 129 completely out of the path of the driving pins 130, thus preventing any clicking of the driving pins against the pivoted dog, as they move past it.

The transmission from the driven clutch-dog 129 to the shaft 78 of the two-point controller comprises a bracket 143 on which the pivoted dog 129 is mounted, a driven shaft 144 on which the bracket 143 is mounted and secured, a worm 145 mounted on the shaft 144, and a worm-gear 146 meshing with the worm 145 and mounted on the two-point controller-shaft 78.

Coming now to the selective mechanism controlled by the manual control-board 17, previously referred to, this comprises a plurality of electro-magnets 147 (Figs. 5, 8 and 9), one for each music-roll, a plurality of swinging L-shaped armature-triggers 21, one for each magnet, a plurality of spring-pressed latches 149, releasable by said triggers respectively, a plurality of links 150, one pivotally connected with each of the spring-pressed latches 149, a plurality of spring-pressed dogs 151, to which the other ends of the links 150 are pivotally connected, a movable abutment-member in the form of a roller or cylinder 152 driven in synchronism with the music-roll-carrying drum 15, a plurality of dog actuating abutments 153, one for each dog 151, mounted in spiral arrangement on the abutment-member, a plurality of rock-arms 154, to which dogs are pivoted respectively, a pivoted universal bar 155 mounted in the path of all of the rock-arms 154, a rock-shaft 156 on which this universal bar 155 is mounted, an arm 157 oscillatable with the rock-shaft 156, a link 158 pivotally connected at one end to this arm 157, a rock-arm 159 to which the other end of the link 158 is pivotally connected, a rock-shaft 160 (coaxial with the rock-shaft 118), on which this rock-arm is mounted, a second rock-arm 161 mounted on this rock-shaft, a link 162 pivotally connected at one end to this second rock-arm 161, a rock-arm 163, to which the other end of this link 162 is pivotally connected, and a clutch-controlling shaft 163ª, on which this rock-arm is mounted, provided with a clutch-controlling finger 164 (Figs. 5 and 7) for cooperation with the clutch-controlling link 140 previously described.

The operation of that part of the controller thus far described is as follows: Assuming that the operator wants to play a certain selection, he presses the corresponding button 18 on the control-board 17. This energizes the corresponding electro-magnet 147, causing it to attract and operate its armature-trigger 21. This releases the corresponding spring-pressed latch 149, (the release of this latch also permits the throwing in of the switch as later described). The release of this spring-pressed latch 149 causes the corresponding dog 151 to be pulled forward into the path of the corresponding abutment 153 on the abutment-member 152. As the corresponding abutment 153 on the abutment-member comes around, it engages the dog 151 which has been pulled forward and carries this dog 151 along with it. This movement of the dog moves the corresponding rock-arm 154, which in turn engages the universal bar 155 and, through the transmission previously described, actuates the clutch-controlling finger 164 to release the clutch-controlling link 140 from engagement with the catch 87 of the clutch-throw-out cam 85, to permit the spring 137 to throw in the clutch. A spring 164$^a$ is provided, which tends to hold the clutch-controlling link 140 against the clutch-throw-out cam 85 and to yieldingly resist the operation of the finger 164, together with the described intermediate connections between said finger and the universal bar 155.

As previously mentioned, the release of the selected spring-pressed latch not only causes the clutch to be thrown in, as described above, but also causes the switch to be thrown in. This throwing in of the switch is effected by means of the universal bar 165 (pivoted at 165$^a$), which is engaged by the selected latch 149 and acts through the lever 166 and link 167, to release the switch-latch 124 moving the shoulder or catch-portion 126 thereof out of the way of the lug 127 on the switch-blade 22 to permit the switch-spring 168 to close the switch.

In order to release a selected dog 151 from the abutment 153, which is driving it, and at the same time to reset the respective spring-pressed pivoted latch 149, the dogs are formed with cam-shaped edges and are mounted in a sort of comb or slotted plate 169, the cam-shaped edge of each selected dog 151, which has been thrown into the path of the corresponding abutment 153, engaging the end of the slot and, as the dog is moved along by its abutment, it is pushed outwardly by this sliding engagement with the end of the slot, so that eventually the respective pivoted latch 149 is restored far enough to permit the corresponding armature-trigger 21 to drop by gravity into retaining position again, shortly after which the selected dog 151 is pushed out by its sliding engagement with the end of the slot so far that the driving abutment disengages it.

It will be noted that there is a sort of inter-control between the two-point controller and the movable abutment-member 152. The main features of this inter-control are that the abutment-member effects the release of the link 140 from engagement with the two-point clutch-throw-out cam 85, thereby permitting the two-point controller to make one half-revolution or to shift from non-playing to playing position and, on the other hand, that the two-point controller actuates the switch-throw-out lever 122 which carries the trigger-controlled switch-blades engaging latch 124, so that (assuming that none of the spring-pressed latches 149 are in released position), when the two-point controller shifts to non-playing position, the main switch will be "pulled" and everything will be stopped.

It will be seen that it is necessary to the operation of the device that the two-point controller shall be operated to make its first half-revolution just before the playing of the selection, to stop the rotation of the drum, position the drum, and bring the tracker-bar down on the music-roll, and that it shall be operated to make its second half-revolution at the end of the selection, to lift the tracker-bar from the music-roll, release the drum-positioning latch, and open the main switch.

The first operation of the two-point controller referred to, is effected by means of the finger 164, controlled by the selected abutment-operated dog 151.

Briefly, this particular operation is as follows: When the operator presses one of the buttons 18 to cause the playing of the desired selection, this energizes one of the electro-magnets 147. The energization of the electro-magnet has two principal results. It allows the main switch-blade 22 to be thrown in to close the switch and start the motor, pump, and various transmissions, and it brings one of the dogs 151 into the path of one of the abutments 153. As the abutment-member 152, rotating in synchronism with the drum 15, revolves, one of the abutments 153 engages the dog 151 and, through the transmission previously described, operates the clutch-controlling finger 164. This releases the clutch-controlling link 140 from the catch 87 on the cam 85 and allows the spring 137 to throw in the clutch 79.

This, for the time being, connects the two-point controller with the drive shaft 45 and gives the two-point controller a half-revolution of movement. The two-point controller is given only a half-revolution of movement because it automatically disconnects itself from the drive shaft by throwing out the clutch at the end of each half-revolution.

The throwing out of the clutch at the end of the first half-revolution of the two-point controller is effected by the shoulder or catch 86, which engages the pin 170 on the clutch-disengaging link 140 and moves this link against the pull of the spring 137 to throw out the clutch. This puts the two-point controller in playing position, causes the drum 15 to stop in the right place, and brings the tracker-bar down on the selected music-roll.

The stopping of the drum in the right place is effected by the disengagement of the friction-wheel 70 from the large friction-wheel 71 and by the bringing down of the latch 32 into the proper positioning notch on the positioning wheel 74, by the transmission previously described.

This first half-revolution of the two-point controller also permits the relief-valve 33 to close, to enable air-tension to be maintained in the pneumatic system, and moves the lever 122 and the trigger-controlled switch-latch 124 (through the operation of lever 84 and the intermediate connections previously described) to retrieve the released switch-blade 22. Unless prevented by the released position of one or more of the spring-pressed latches 149, as hereinafter described, the shoulder or catch-portion 126 of the switch-latch will re-engage the lug 127 on the rear end of the switch-blade, and the return movement of lever 122 will "pull" the switch. But this return movement of the lever does not occur at this time. It is brought about through the second half-revolution of the two-point controller, which will be described presently.

I will now outline the arrangement of the pneumatic system, a schematic illustration of which is shown in Fig. 21. This comprises essentially the pneumatic switchboard 12, two pneumatics 26 and 29 for controlling the direction of travel of the music-roll, two pneumatics 171 and 172 for use in controlling the clutch-controlling link 140, and two master-pneumatics 173 and 174 controlled respectively from the replay perforation and the reroll perforation in the music-roll. These two master-pneumatics 173 and 174 control the other four pneumatics 26, 29, 171 and 172.

A construction is provided, hereinafter described, whereby the master-pneumatic 173, caused to collapse when the music-roll replay perforation uncovers the replay hole in the tracker, will stay collapsed until the music-roll reroll perforation uncovers the reroll hole in the tracker. In a similar manner, means are provided whereby the master-pneumatic 174, which is caused to collapse when the reroll perforation uncovers the reroll hole in the tracker, will stay collapsed until the replay perforation crosses the tracker on the rewinding movement of the music-roll. The same valve 174$^a$ (Fig. 21) which controls the collapse and expansion of the master-pneumatic 174 (which valve is controlled from the reroll perforation through tracker-tube 174$^b$) also controls the collapse and expansion of the forward travel pneumatic 26, the rewind pneumatic 29, and the clutch-controlling pneumatic 171. From this it follows that, when this master-pneumatic 174 is collapsed, the three other pneumatics 26, 29 and 171, referred to, also will be collapsed and, when this master-pneumatic is expanded, all three of these other pneumatics will be expanded.

The construction is also such that the same valve 173$^a$ (Fig. 21) which controls the master-pneumatic 173 (controlled from the replay perforation through tracker-tube 173$^b$) also controls the other clutch-controlling pneumatic 172, so that, when this master-pneumatic 173 is collapsed, this clutch-controlling pneumatic 172 also will be collapsed and, when this master-pneumatic is expanded, this clutch-controlling pneumatic also will be expanded.

Having in mind this control exercised upon and by the two master-pneumatics, I will now describe the sequence of operations as the music-roll is drawn forward in its playing movement and afterward rewound.

Assuming that the operation has progressed as far as previously described, that is, that the desired music-roll has been brought into playing position, that the cam 85 has completed its first half-revolution (the catch 86 now engaging the pin 170 on the clutch-controlling link 140) and the tracker-bar brought down on this selected music-roll, and that the drive gear 34 of the selected take-up spool 28 is in mesh with the take-up drive pinion 37 (the master-pneumatic 174 being now expanded and the pneumatics 26 and 29 as a consequence also being expanded to allow the respective springs 26$^a$, 29$^a$ to hold the take-up drive pinion in mesh and the rewind gear 36 out of mesh), the music-roll will be drawn forward over the tracker, causing the selection to be played on the remote musical instrument. Of course, before the selection begins, the replay perforation crosses or completes its forward movement across the tracker, but this exerts no controlling effect at this time on any part of the mechanism, as will be evident later.

After the end of the selection, the reroll perforation uncovers the reroll hole in the tracker, causing the master-pneumatic 174 to collapse (and remain collapsed until the replay perforation uncovers the replay hole in the tracker as hereinafter explained). This collapse of the master-pneumatic 174 occurs with the collapse of the three pneumatics 26, 29 and 171, as hereinbefore explained. The collapse of the pneumatic 26 moves the take-up drive pinion 37 out of mesh with the take-up spool drive gear 34. The collapse of the pneumatic 29 brings the rewind gear 36 into mesh with the rewind pinion 31 and, as the gear 36 is rotating, the music-roll starts to rewind. The collapse of the pneumatic 171 releases the clutch-controlling link 140 from the catch 86 but does not permit the clutch to be thrown in yet, as the finger 175 (Fig. 7) on the movable leaf of this pneumatic 171 engages a notch 177 in the clutch-controlling link 140 and for the present holds this link 140 against the tension of the spring 137, which tends to throw in the clutch. The link 140 is longitudinally displaced, however, sufficiently to move the catch-engaging pin 170 slightly to the right from the position shown in Fig. 7, so that, when the pneumatic 171 is again expanded, the spring 164ª cannot return the link 140 upwardly to bring the pin into engaging relation with the shoulder 86.

The rewinding movement continues until the music-roll is about rewound, when the replay perforation uncovers the replay hole in the tracker, causing the collapse of the master-pneumatic 173 and of the clutch-controlling pneumatic 172. The collapse of this clutch-controlling pneumatic 172 causes the expansion of the other clutch-controlling pneumatic 171, by a connection hereinafter described in detail, and lifts the finger 175, causing it to disengage the notch 177 in the clutch controlling link 140 to permit the clutch to be thrown in by the spring 137.

This throwing in of the clutch causes another half-revolution of the two-point controller (the two-point controller automatically throwing the clutch out at the end of the half-revolution by the engagement of the catch 87 with the pin on the clutch-controlling link 140), and this second half-revolution of the two-point controller "pulls" the switch (assuming that switch-latch 124 has been allowed to re-engage the lug 127) and stops the electric motor through the cam 83 and related transmission previously described, opens the air inlet valve 33 by means of the cam 81 to kill the suction in the pneumatic system, lifts the tracker 25 from engagement with the music-roll, and disengages the latch 32 from the positioning wheel 74. This leaves the apparatus ready for the operator to start it to playing any other desired one of the music-rolls.

Going back, now, to describe the construction whereby the master-pneumatic 174 is collapsed when the reroll perforation uncovers the reroll hole in the tracker and stays collapsed until the replay perforation uncovers the replay hole in the tracker, and whereby the master-pneumatic 173 is collapsed when the replay perforation uncovers the replay hole in the tracker and stays collapsed until the reroll perforation uncovers the reroll hole in the tracker, this comprises an oscillating valve 178 (Figs. 4 and 21), a pair of ports 179 and 180 controlled by this oscillating valve, and a pair of pivoted spring-pressed catches 181 and 182, carried by the master-pneumatics 173 and 174, respectively, for controlling this oscillating valve 178.

The port 179 is connected with the same tracker-tube 173ᵇ (Fig. 21) which is connected with the replay tracker-hole and the port 180 is connected with the same tracker-tube 174ᵇ which is connected with the reroll tracker-hole. The construction is such that, when the master-pneumatic 173 is collapsed, the oscillating valve 178 uncovers the port 179 and covers the port 180, and that, when the master-pneumatic 174 is collapsed, the valve 178 uncovers the port 180 and covers the port 179.

This operation of the valve is effected by the spring-pressed catches 181 and 182. When the master-pneumatic 173 collapses the hook of the catch 181 (pivoted on the movable leaf of the pneumatic) engages and lifts the adjacent end of the valve 178, uncovering the port 179 and covering the port 180.

In a similar manner, when the master-pneumatic 174 collapses, the hook of the catch 182, pivoted to the pneumatic 174, engages and lifts the adjacent end of the valve 178, uncovering the port 180 and covering the port 179.

The arrangement is such that each of the catches 181 and 182, after having shifted the oscillating valve 178, will slip off from the respective end of the valve at the end of its movement thereof, thus releasing itself therefrom and leaving the valve free to be moved in the reverse direction at the proper time.

With this construction, it will be seen that (assuming there is suction in the pneumatic system) each of the master-pneumatics 173 and 174 will stay collapsed, after it has once been caused to collapse by the proper opening in the music-roll, until the other master-pneumatic is collapsed.

When the music-roll replay perforation registers with the replay tracker-hole, a tracker-controlled replay valve (indicated at 173ª, Fig. 21, but not further shown, because it may be of any suitable or well known construction) will be operated to cause the collapse of the master-pneumatic 173 and the simultaneous collapse of the pneumatic 172, as hereinbefore mentioned. The collapse of the master-pneumatic 173 will effect the movement of the oscillating valve 178 to the position shown in Figs. 4 and 21, uncovering the port 179 and covering the port 180. The port 179, being connected with the same tracker-tube 173ᵇ which is connected with the replay hole in the tracker, will thus admit atmospheric air to the aforesaid tracker-controlled replay valve 173ª, and the pneumatics 172 and 173 will stay collapsed, even after the replay perforation has passed over and away from the tracker, until the oscillating valve 178 is shifted in the reverse direction to cover the port 179 and uncover the port 180. It will thus be seen that the valve 178 must be disengaged from the catch 181, in order that it may be thus shifted while the master-pneumatic 173 stays collapsed. This disengageable feature of the catches 181 and 182 has just been described. The covering of port 180, which is connected with the same tracker-tube 174$^b$ which is connected with the reroll hole in the tracker, stops the admission of atmospheric air which had previously caused the master-pneumatic 174 and the pneumatics 26, 29, and 171 to be held collapsed during a previous rewinding operation, and these pneumatics are allowed to expand simultaneously with the collapse of the other pneumatics 172 and 173. Upon the expansion of master-pneumatic 174, the catch 182 carried thereby will re-engage with its respective end of the oscillating valve 178, while the catch 181, carried by the master-pneumatic 173, will have been moved out of engagement with the valve, in the manner heretofore described.

When the music-roll reroll perforation registers with the reroll tracker-hole, a tracker-controlled rewind valve (indicated at 174$^a$, Fig. 21, but not otherwise shown, also because it may be of any suitable or well known construction) will be operated to cause the collapse of the master-pneumatic 174 and the simultaneous collapse of the pneumatics 26, 29, and 171, as hereinbefore mentioned. The collapse of the master-pneumatic 174 will effect the reverse movement of the oscillating valve 178, uncovering the port 180 and covering the port 179. The uncovering of the port 180 effects the continued collapse of the pneumatics 174, 26, 29, and 171 in the same manner as that described in connection with the continued collapse of pneumatics 172 and 173 caused by the uncovering of port 179, until the rewinding of the music-roll has been completed and the replay perforation again registers with the replay tracker-hole, while the covering of port 179 stops the admission of atmospheric air which had previously caused the master-pneumatic 173 and the pneumatic 172 to be held collapsed during the playing operation, and these two pneumatics are allowed to expand simultaneously with the collapse of the other pneumatics 174, 26, 29 and 171. Upon the expansion of master-pneumatic 173, the catch 181 carried thereby will re-engage with its respective end of the oscillating valve 178, while the catch 182, carried by the master-pneumatic 174, will in turn have been moved out of engagement with the valve, leaving it free to be operated again by the master-pneumatic 173.

By referring to Fig. 21, it will be seen that the replay valve 173$^a$ and the rewind valve 174$^a$ are connected, by a conduit 173$^c$, directly with the pump 24 and that, in addition to the parts already described as controlled thereby, the supply of air-pressure to effect the operation of the pneumatic switchboard 12 is also controlled, through a conduit 173$^d$, by the replay valve 173$^a$.

Going back, now, to the connection between the two clutch-controlling pneumatics 171 and 172, this comprises a link 183 (Fig. 7), pivotally connected at 183$^a$ to the movable leaf 176 of the pneumatic 171 and having a slidable lost-motion connection with the movable leaf 184 of the other pneumatic 172 at 185. With this construction, it will be seen that the pneumatic 171 is free to collapse if the pneumatic 172 is expanded, but that, when the pneumatic 172 collapses it will pull the pneumatic 171 open.

It may be here stated that, if the operator should desire several selections to be played, one after the other, he can simply press the push-buttons 18 corresponding to the desired selections, all at the same time, and the desired selections will be automatically played one after the other. In other words, if a number of push-buttons 18 are pressed, the motor will not stop at the end of the first selection, but will continue to run, and will cause the succeeding selected music-roll to be brought into playing position and the corresponding selection to be played.

The trigger-controlled switch-latch 124 is the principal factor which enables the above result to be accomplished. If the shoulder 126 on this trigger-controlled switch-latch 124 does not engage the lug 127 on the switch-blade 22, the switch-blade 22 will not be thrown out, upon the second half-revolution of the two-point controller, by the action of the cam 83 and associated transmission, but the shoulder 126 will simply pass by the lug 127 and exert no effect on the switch blade.

The shoulder 126 cannot engage the lug 127 so long as any of the spring-pressed latches 149 have not been restored. As previously intimated, these spring-pressed latches 149 are not restored until the corresponding spring-pressed dogs 151 have been pushed up by the dog-actuating abutments 153 on the abutment-member 152. Consequently, the motor will continue to run so long as a single one of the spring-pressed latches 149 has not been restored, and, if the operator has pressed several of the buttons 18, all of the corresponding selections will be played one after the other.

As previously stated, means are provided whereby, if the operator desires, he can stop the playing of any selection before the end, and cause the music-roll to be rewound. This is effected by pressing the "stop" button 18 (Fig. 14), which is connected with an electro-magnet and complemental valve (indicated at 174$^e$ (Fig. 21), the construction being like that shown at 7 and 8, respectively, in Fig. 12), which valve, when opened, causes the collapse of the master-pneumatic 174 and of the pneumatics 26, 29 and 171 in the same manner as the valve 7 causes the collapse of its respective power-pneumatic 2ª, hence causing the rewinding of the music-sheet and (unless switch-latch 124 is held from engaging lug 127 on switch-blade 22, as previously explained) the stopping of the motor at the end of the rewind when the replay perforation reaches the tracker.

I will now describe, somewhat more in detail, the construction, shown in Figs. 17 and 18, for controlling the winding and rewinding of the music-roll.

Referring first to Fig. 17, which shows the winding or take-up mechanism, the shaft 60, which carries the take-up drive pinion 37, is mounted in a bearing 186 which is pivotally mounted at 187 on the bracket 188, so that the end of the shaft 60 which carries the pinion 37 can move up and down about the pivot 187 to bring this pinion 37 into and out of mesh with the take-up spool drive gear 34. The up and down movement of the pinion-carrying end of the shaft 60 is effected by means of the pneumatic 26, the movable leaf of which is connected by a link 189 to a bearing 190 for the shaft 60, which bearing is slidable up and down in the bracket 191.

In a similar manner, the rewind gear 36 Fig. 18 can be moved into and out of mesh with the rewind pinion 31. The shaft 64, which carries the gear 36, is mounted in a bearing 192 which is pivoted at 193 on the bracket 194, so that the end of the shaft 64 which carries the gear 36 can move up and down. The up and down movement of the gear-carrying end of the shaft 64 is effected by means of the pneumatic 29, the movable leaf of which is connected by a link 195 to a bearing 196 for the shaft 64, which bearing is slidably mounted in the bracket 197.

As previously described, the pneumatics 26 and 29 are connected so that both of them are collapsed when the rewind master-pneumatic 174 is collapsed, and are expanded when this master-pneumatic 174 is expanded. Consequently, when the reroll perforation reaches the tracker, after the end of the selection, both of the pneumatics 26 and 29 will be collapsed, and will stay collapsed during the collapse of the master-pneumatic 174. This collapse of the pneumatics 26 and 29 causes the take-up drive pinion 37 to move out of engagement with the take-up drive gear 34, and causes the rewind gear 36 to move into mesh with the rewind pinion 31, thus causing the rewinding of the music-roll. When the music-roll is rewound and the replay perforation reaches the tracker, the master-pneumatic 174 and the pneumatics 26 and 29 will be allowed to expand as hereinbefore described, to bring the transmission into playing position again.

It may be noted that, while I have employed the term "replay" when referring to the music-roll replay perforation, the replay tracker-hole, and the tracker-controlled replay valve for controlling the collapse and expansion of the pneumatics 172 and 173, the construction is such that the replay perforation in reality constitutes a "stop" perforation. Although the registration of the replay perforation with the replay tracker-hole effects the disengagement of the rewinding transmission and the engagement of the forward driving transmission for the music-roll, the simultaneously effected second half-revolution of the two-point controller results in the withdrawal of the tracker, the release of the drum-positioning latch, and the re-engagement of the drum-driving friction-wheels 70 and 71 and it also results (unless prevented, as aforesaid), in the opening of the main switch and the consequent stopping of the operation of both the controller and the musical instrument. In addition to this, it may be noted (1) that the restoration of each selected spring-pressed latch 149 to its latched position does not occur until the corresponding spring-pressed dog 151 has been moved nearly out from its operative engagement with the respective abutment 153; (2) that the movement of each selection spring-pressed dog 151 continues until it is moved out of such operative engagement, upon which it returns to its inactive position, ready to be again brought into the path of movement of its respective abutment 153; (3) that the movement of the abutment-member 152 is in synchronism with that of the music-roll-carrying drum 15, and the stopping of the movement of these two elements is effected by the last part of the movement of each selected dog by its respective abutment, at which point the respective selected music-roll has been brought into operative position beneath the tracker 25; and (4) that, upon the re-selection of any one of the dogs 151 by the release of its respective latch 149, the abutment-member 152 and the drum 15 will both have to make a complete revolution in order to effect a re-engagement of the proper abutment with the re-selected dog and complete its movement. It therefore follows that, although the pressing of the same selective push-button 18, if pressed after the respective abutment has completed its movement of, and release from engagement with, the dog 151 (and it would have to be pressed at such time in order to produce a re-selecting effect), will effect a second playing of the same selection, such playing will not be brought about until the abutment-member has made a complete revolution, and, if any other selections have been registered by the release of other latches 149, these other selections will be played in the order determined by the arrangement of the respective abutments upon the abutment-member, and before the re-selected selection will be replayed. The re-setting of any selective latch acts, therefore, as a new setting thereof, and, while the devices will continue to operate until the re-selected selection has been played (since, as hereinbefore mentioned, the main switch will not be thrown out or opened until all of the latches 149 have been restored to latched position), the roll-carrying drum 15 must necessarily make a complete revolution before the music-roll representing that selection can be again brought into its operative position beneath the tracker.

In Figs. 2, 4, 15, and 16 is shown a construction whereby the operator can set the controller so that any desired tempo can be given individually to the various music-rolls mounted on the drum. This construction comprises a cage 198, driven in synchronism with the drum 15, and a plurality of adjustable devices 199 (one for each music-roll) mounted on this cage 198. Each of these adjustable devices comprises an adjustable bearing plate or disc 200 which is for engagement with a brake-lever 201, pivoted at 202 and has a brake pad or shoe 203 for engagement with the rotatable friction-plate 204 on the fly-ball governor 205.

It is sufficient, for the purposes of this application, to state that the position of the brake-lever 201 determines the ratio of the speeds, transmitted by the variable speed transmission 55, between the sprocket 54 and the shaft 56.

For a further disclosure of this variable speed transmission 55, reference is made to my Patent #1,387,704, dated August 16, 1921.

In each of the adjustable devices 199 mounted on the cage 198, the disc or plate 200 has a threaded engagement with a manually adjustable screw 206, the plate 200 being held against rotation with the screw by means of a hole 207 near its edge which receives a pin 208 extending between the plates 209 and 210 of the cage, this pin and hole providing a sliding engagement between the disc 200 and the pin 208. The manually adjustable screw 206 is rotatably mounted in openings in the plates 209 and 210 of the cage and is provided with a finger-button 211 to facilitate adjustment, and with an index 212, for cooperation with a scale 213, to indicate the tempo.

The rotatable cage is driven in synchronism with the music-roll-carrying drum by a transmission including a sprocket 214 (Fig. 2) rotatable with the drum 15, a sprocket-chain 215 running over the sprocket 214, a sprocket 216 driven by the sprocket-chain 215, a sprocket 217 rotatable with the sprocket 216, a sprocket-chain 218 running over the sprocket 217, a sprocket 219 driven by the sprocket-chain 218, a shaft 220 (Figs. 2 and 15) on which the sprocket 219 is mounted, a bevel-gear 221 mounted on the shaft 220, and a bevel-gear 222 meshing with the bevel-gear 221 and rotatable with the cage 198.

It may be stated, at this point, that the abutment-member 152 rotates with the sprocket 216, so that, as previously noted, it also rotates in synchronism with the music-roll-carrying drum. A coil compression-spring 223 is provided for each of the adjustable discs 200, to insure a positive engagement between each disc and screw, and to assist in holding the disc in any position to which it may be adjusted.

In use and operation, the various indexes are set for the desired tempos, causing the discs 200 to be correspondingly adjusted. As the drum 15 rotates to bring the desired music-roll into playing position, the cage 198 is also rotated in synchronism with the drum to bring the proper speed-controlling disc 200 into operative relation with the speed-controlling brake-lever 201. The position to which the speed-controlling disc 200 is adjusted determines the position to which the speed-controlling brake-lever 201 can move, and hence determines the speed-ratio of the variable speed transmission 55, and the rate of travel of the respective music-roll in its forward movement.

For a further description of the controller shown in Figs. 8 and 9, reference is made to my co-pending application, Serial No. 500,802, filed Sept. 15, 1921.

The use and operation of the controller has been outlined in connection with the description of the construction. Briefly, the rotatable drum or magazine is "loaded" with the desired music-rolls, whereupon the operator, by pressing one or more of the buttons 18 corresponding to the selection or selections desired, can cause the playing of these selections, one after the other, on the remote musical instrument. The pressing of one of the buttons 18 causes the drum or magazine to rotate until the selected music-roll is in position under the tracker, whereupon the tracker is brought down on the music-roll, and the take-up spool is rotated to draw the music-roll forward over the tracker. When the various music-roll perforations cross the tracker, they cause the selection to be played on the remote instrument. When the reroll perforation crosses the tracker, it causes the music-roll to be rewound and the mechanism to be reset, ready for the playing of another selection.

While I have shown but one form of my invention, it is obvious that many changes and modifications may be made which would be within the spirit and scope thereof.

Having thus described my invention, what I claim as new and desire to secure by Letters Patent of the United States is:

1. The combination, with an automatic musical instrument having note-sounding devices and means for actuating them, of a multi-record controller separate from said instrument but connected therewith for controlling the operation of said actuating means, comprising means for supporting a plurality of records and manually controllable means for selectively causing any desired one of said records to be played on said instrument.

2. The combination, with an automatic musical instrument having note-sounding devices, power-pneumatics for actuating said note-sounding devices, and electrical power devices for controlling said power-pneumatics of a multirecord controller separate from said instrument but connected therewith for controlling the operation thereof, comprising means for supporting a plurality of perforated music-rolls, pneumatic power devices controllable by said music-rolls, electrical control devices controlled by said pneumatic power devices, electrical connections between said electrical control devices and said electrical power devices, and manually operable means for selectively causing any desired one of said music-rolls to be played on said instrument.

3. The combination, with an automatic musical instrument having note-sounding devices and means for actuating them, of a multirecord controller separate from instrument but connected therewith for controlling the operation of said actuating means, comprising means for supporting a plurality of records and manually controllable means for selectively causing any desired one of said records to be played on said instrument, said manually controllable means comprising a control device separate from said multirecord controller.

4. The combination, with an automatic musical instrument having note-sounding devices and means for actuating them, of a multirecord controller separate from said instrument but connected therewith for controlling the operation of said actuating means, comprising means for supporting a plurality of records and manually controllable means for selectively causing any desired one of said records to be played on said instrument, said manually controllable means comprising a readily portable control device separate from said multirecord controller.

5. A multirecord controller comprising a movable carrier having means for supporting a plurality of music rolls thereon for winding and rewinding movement, a plurality of music-rolls supported by said supporting means, a tracker-bar for cooperation with said music-rolls, pneumatic power devices controlled by said music-rolls, an electrical motor, a vacuum-pump driven by said motor to provide pneumatic power for said power devices, winding and rewinding transmission from said motor to said music-rolls, a power-pneumatic for bringing the winding transmission in operative relation to a selected music-roll, a second power-pneumatic for bringing the rewinding transmission in operative relation to a selected music-roll, transmission from said motor to said movable carrier to bring a selected music-roll in position with respect to said tracker-bar, control means for rendering said carrier-transmission effective or ineffective to move the carrier, means for definitely positioning said carrier with respect to said tracker-bar when said carrier transmission is rendered ineffective, means for bringing the tracker-bar into cooperative relation with a selected music-roll when said carried transmission is rendered ineffective, a switch for said electrical motor, a rotatable controller driven from said motor, a clutch between said motor and rotatable controller, and an air inlet valve for breaking the vacuum created by said air-pump; said rotatable controller having means for controlling said carrier positioning means, said tracker-actuating means, and said carrier transmission control, and having a cam for controlling said air inlet valve, a cam for controlling said switch, a pair of actuators for controlling said clutch, and a spring tending to hold said clutch in engaging position, each of said actuators being constructed to disengage said clutch after said rotatable controller has made a half-revolution.

6. A selective controller for controlling the motor switch and carrier drive control-clutch of a multirecord carrier comprising a plurality of electrically actuated triggers, one for each record on the carrier, a plurality of clutch-controlling dogs, one controlled by each trigger, a dog-actuating roller having a plurality of abutment-pins, one for each dog, arranged in different positions on said roller, a universal bar actuated by a selected dog for throwing in the clutch, a universal bar actuated by a selected trigger for controlling the throwing in of the switch, and means whereby the actuation of a selected dog by its cooperating abutment-pin will cause its respective trigger to be reset.

7. A multirecord controller comprising a movable carrier, means for mounting a plurality of music-rolls thereon for winding and rewinding movement, a motor, winding transmission between said motor and said music-roll-mounting means, said transmission including a variable speed drive and means for controlling said variable speed drive, to control the tempo of each music-roll.

8. A multirecord controller comprising a movable carrier means for mounting a plurality of music-rolls thereon for winding and rewinding movement, a motor, winding transmission between said motor and said music-roll-mounting means, said transmission including a variable speed drive and means for controlling said variable speed drive, to control the tempo of each music-roll, comprising a plurality of individually adjustable devices, one for each music-roll.

9. A multirecord controller comprising a movable carrier, means for mounting a plurality of music-rolls thereon for winding and rewinding movement, a motor, winding transmission between said motor and said music-roll-mounting means, said transmission including a variable speed drive and means for controlling said variable speed drive, to control the tempo of each music-roll, comprising a plurality of individually adjustable devices, one for each music-roll, and means for moving said individually adjustable devices, in synchronism with said movable carrier.

10. The combination, with an automatic musical instrument having note-sounding devices, an air-pump for furnishing wind for said pneumatics, and an electric motor for actuating said air-pump, of a multirecord controller for said instrument, separate and remote therefrom, comprising means for supporting a plurality of records and manually controllable means for selectively causing any desired one of said records to be played on said remote instrument, said multirecord controller comprising means whereby said air-pump-motor will automatically be put in operation to effect the playing of the selection.

11. The combination, with an automatic musical instrument having note-sounding devices and means for actuating them, of a device separate from said instrument but connected therewith for controlling the operation of said actuating means and comprising means for supporting and propelling a record, and means separate from said controlling device but connected therewith for controlling the playing of said record upon said instrument.

12. The combination, with an automatic musical instrument having note-sounding devices, means for actuating them, and means for varying the character of the notes when sounded, of a device separate from said instrument but connected therewith for controlling the operation of said actuating means and said determining means and comprising means for supporting and propelling a record, and means separate from said controlling device but connected therewith for controlling the playing of said record upon said instrument.

13. The combination, with an automatic musical instrument having note-sounding devices, pneumatically operable means for actuating them, and an air-pump for supplying pneumatic power for operating said actuating means, of a device separate from said instrument but connected therewith for controlling the operation of said actuating means and comprising means for supporting and propelling a record, and means for controlling the operation of said air-pump and the playing of said record upon said instrument.

14. The combination, with an automatic musical instrument having note-sounding devices, pneumatically operable means for actuating them, an air-pump for supplying pneumatic power for operating said actuating means, and means for determining the degree of pneumatic power applicable to the operation of said actuating means, of a device separate from said instrument but connected therewith for controlling the operation of said actuating means and said power-determining means and comprising means for supporting and propelling a record, and means for controlling the operation of said air-pump and the playing of said record upon said instrument.

15. The combination, with an automatic musical instrument having note-sounding devices and pneumatically operable means for actuating them, of a device separate from said instrument but electrically connected therewith for controlling the operation of said pneumatically operable actuating means and comprising means for supporting and propelling a record, and means separate from said controlling device but electrically connected therewith for controlling the playing of said record upon said instrument.

16. The combination, with an automatic musical instrument having note-sounding devices and means for actuating them, of a multirecord controller for controlling the operation of said actuating means comprising means for supporting a plurality of separately removable records, and manually controllable means separate from said controller but connected therewith for selectively causing any desired one of said records to be played on said instrument.

17. The combination, with an automatic musical instrument having note-sounding devices, means for actuating them, and means for determining the tonal qualifications of the notes when sounded, of a multirecord controller separate from said instrument but connected therewith for controlling the operation of said actuating means and said determining means, comprising means for supporting a plurality of separately removable records and means for propelling any selected one of said records, and manually controllable means separate from said controller but connected therewith for selectively causing any desired one of said records to be propelled by said propelling means to effect and control the operation of said actuating means and said determining means.

18. The combination, with an automatic musical instrument having note-sounding devices, pneumatically operable means for actuating them, and an air-pump for supplying pneumatic power for operating said actuating means, of a multirecord controller separate from said instrument but connected therewith for controlling the operation of said actuating means and said air-pump, comprising means for supporting a plurality of separately removable records and means for propelling any selected one of said records, and manually controllable means separate from said controller but connected therewith to effect the starting of said air-pump and selectively cause any desired one of said records to be propelled by said propelling means to effect and control the operation of said actuating means.

19. The combination, with an automatic musical instrument having note-sounding devices and means for actuating them, of a multirecord controller for controlling the operation of said actuating means, comprising a tracker, means for supporting a plurality of records, means for propelling a selected record across said tracker, and selecting means for selectively bringing one of said plurality of records, said tracker, and said propelling means into co-operative relationship, and manually operable selecting means separate from said controller but connected therewith for controlling the operation of said selecting means.

20. The combination, with an automatic musical instrument having note-sounding devices and means for actuating them, of a multirecord controller separate from said instrument but connected therewith for controlling the operation of said actuating means, comprising a tracker, means for supporting a plurality of records, means for propelling a selected record across said tracker, and selecting means for selectively bringing one of said plurality of records, said tracker, and said propelling means into co-operative relationship, and means for controlling the operation of said selecting means.

21. The combination, with an automatic musical instrument having note-sounding devices and means for actuating them, of a multirecord controller separate from said instrument but connected therewith for controlling the operation of said actuating means, comprising a tracker, means for supporting a plurality of records, means for propelling a selected record across said tracker, and selecting means for selectively bringing one of said plurality of records, said tracker, and said propelling means into co-operative relationship, and manually operable selecting means separate from said controller but connected therewith for controlling the operation of said selecting means.

22. The combination, with an automatic musical instrument having note-sounding devices and means for actuating them, of a multirecord controller for controlling the operation of said actuating means, comprising a tracker, means for supporting a plurality of records, means for propelling a selected record across said tracker, means for rewinding said record, and selecting means for selectively bringing one of said plurality of records, said tracker, said propelling means, and said rewinding means into co-operative relationship, and means for controlling the operation of said selecting means.

23. A multirecord controller for automatic musical instruments comprising driving means, a tracker, a movable carrier for supporting a plurality of music-rolls for movement of each thereof into position for selective association with said tracker, carrier moving means driven by said driving means and movable into and from operative connection with said carrier, winding and rewinding mechanism driven by said driving means and separately movable into and from operative connection with a selected music-roll, and separately operable means for moving said carrier moving means, said winding mechanism, and said rewinding mechanism.

24. A multirecord controller for automatic musical instruments comprising driving means, a movable tracker, a movable carrier for supporting a plurality of music-rolls for movement of each thereof into position for selective association with said tracker, carrier moving means driven by said driving means and movable into and from operative connection with said carrier, carrier latching means for determining the positioning of said carrier to properly position a selected music-roll with respect to said tracker, reciprocably movable means operable by said driving means and acting upon movement in one direction to disconnect said carrier moving means from operative connection with said carrier, engage said carrier latching means, and move said tracker into operative association with a selected music-roll, and means for causing and arresting such movement of said reciprocably movable means.

25. A multirecord controller for automatic musical instruments comprising driving means, a movable tracker, a movable carrier for supporting a plurality of music-rolls for movement of each thereof into position for selective association with said tracker, carrier moving means driven by said driving means and movable into and from operative connection with said carrier, carrier positioning means for determining the positioning of said carrier to properly position a selected music-roll with respect to said tracker, means connectible with said driving means for alternately moving said carrier moving means from and into operative connection with said carrier, engaging and disengaging said carrier positioning means, and moving said tracker into and from operative association with a selected music-roll, and means for connecting and disconnecting said connectible means for effecting and terminating each alternate movement of said parts.

26. A multirecord controller for automatic musical instruments comprising driving means, a movable tracker, a movable carrier for supporting a plurality of music-rolls for movement of each thereof into position for selective association with said tracker, carrier moving means driven by said driving means and movable into and from operative connection with said carrier, carrier positioning means for determining the positioning of said carrier to properly position a selected music-roll with respect to said tracker, means connectible with said driving means for alternately moving said carrier moving means from and into operative connection with said carrier, engaging and disengaging said carrier positioning means, and moving said tracker into and from operative association with a selected music-roll, and automatically operated means for connecting and disconnecting said connectible means for effecting and terminating such alternate movement of said parts at predetermined periods.

27. A multirecord controller for automatic musical instruments comprising driving means, a movable tracker, a movable carrier for supporting a plurality of music-rolls for movement of each thereof into position for selective association with said tracker, carrier moving means driven by said driving means and movable into and from operative connection with said carrier, carrier positioning means for determining the positioning of said carrier to properly position a selected music-roll with respect to said tracker, means connectible with said driving means for alternately moving said carrier moving means from and into operative connection with said carrier, engaging and disengaging said carrier positioning means, and moving said tracker into and from operative association with a selected music-roll, means for connecting and disconnecting said connectible means for effecting and terminating such alternate movement of said parts, and selecting means for selectively determining which one of said plurality of music-rolls shall be brought into operative association with said tracker; said selecting means comprising means for controlling the operation of said connecting and disconnecting means.

28. A multirecord controller for automatic musical instruments comprising driving means; a movable tracker; a movable carrier for supporting a plurality of music-rolls for movement of each thereof into position for selective association with said tracker; carrier moving means driven by said driving means and movable into and from operative connection with said carrier; carrier positioning means for determining the positioning of said carrier to properly position a selected music-roll with respect to said tracker; means connectible with said driving means, having two phases of movement, and arranged to effect its own disconnection from said driving means at the end of each of such phases, one of such phases of movement effecting the movement of said carrier moving means from operative connection with said carrier, the engagement of said carrier positioning means, and the movement of said tracker into operative association with a selected music-roll, and the other of such phases of movement effecting the movement of said tracker from such operative association, the disengagement of said carrier positioning means, and the return of said carrier moving means into operative connection with said carrier; and selecting means for selectively determining which one of said plurality of music-rolls shall be brought into operative association with said tracker, comprising means for initiating one of such phases of movement of said connectible means.

29. The combination, with an automatic musical instrument having note-sounding devices and means for actuating them, of a device separate from said instrument but connected therewith for controlling the operation of said actuating means, comprising means for supporting and propelling a record, and manually controllable means separate from said controlling device but connected therewith for controlling the playing of said record upon said instrument, comprising manually controllable means for initiating such playing and other manually controllable means for stopping it.

30. The combination, with an automatic musical instrument having note-sounding devices and means for actuating them, of a multirecord controller for controlling the operation of said actuating means, comprising means for supporting a plurality of records, of manually controllable means connected with said controller for selectively causing any desired one of said records to be played upon said instrument, comprising manually controllable means for registering the selection of one of said plurality of records and initiating the playing of the selected record and other manually controllable means for cancelling the registration and stopping the playing.

31. The combination, with an automatic musical instrument having note-sounding devices and means for actuating them, of a device for controlling the operation of said actuating means, comprising means for supporting a record, means for propelling said record, and means for rewinding it, and manually controllable means separate from said controlling device but connected therewith for controlling the playing of said record upon said instrument, comprising manually controllable means for effecting the propelling of said record by said propelling means and other manually controllable means for stopping such propelling, at will, and effecting the immediate rewinding of said record by said rewinding means.

32. The combination, with an automatic musical instrument having note-sounding devices and means for actuating them, of a multirecord controller for controlling the operation of said actuating means, comprising means for supporting a plurality of records, controllable selecting means for effecting the selection of any one of said plurality of records for playing upon said instrument, means for propelling a selected record, and controllable rewinding means for rewinding said record, and manually controllable means connected with said controller for selectively causing any desired one of said records to be played upon said instrument, comprising manually controllable means connected with said selecting means for registering the selection of one of said plurality of records and effecting the propelling of the selected record by said propelling means, and other manually controllable means connected with said rewinding means for stopping such propelling, at will, and immediately effecting the rewinding of said selected record by said rewinding means.

33. The combination, with an automatic musical instrument having note-sounding devices and means for actuating them, of a device for controlling the operation of said actuating means, comprising means for supporting a record, electro-pneumatically controllable means for propelling said record, and electro-pneumatically controllable means for rewinding it, and manually controllable means electrically connected with said controlling device for controlling the playing of said record upon said instrument, comprising manually controllable electric means for controlling the operation of said electro-pneumatically controllable propelling means, and other manually controllable electric means for controlling the operation of said electro-pneumatically controlled rewinding means.

34. The combination, with an automatic musical instrument having note-sounding devices and means for actuating them, of a multirecord controller for controlling the operation of said actuating means, comprising means for supporting a plurality of records, electro-mechanically controllable means for effecting the selection of any one of said plurality of records for playing upon said instrument and for propelling a selected record, and electro-pneumatically controllable means for rewinding it, and manually controllable means electrically connected with said controlling device for selectively causing any desired one of said records to be played upon said instrument, comprising manually controllable electrical means for controlling the operation of said electro-mechanically controllable selecting and propelling means, and other manually controllable electrical means for controlling the operation of said electro-pneumatically controllable rewinding means.

35. The combination, with an automatic musical instrument having note-sounding devices and means for actuating them, of a device separate from said instrument but electrically connected therewith for controlling the operation of said actuating means, comprising means for supporting and propelling a record, and manually controllable means separate from said controlling device but electrically connected therewith for controlling the playing of said record upon said instrument, comprising an electrical push-button for initiating such playing and another electrical push-button for stopping it.

36. The combination, with an automatic musical instrument having note-sounding devices and means for actuating them, of a multirecord controller for controlling the operation of said actuating means, comprising means for supporting a plurality of records, and manually controllable means electrically connected with said controller for selectively causing any desired one of said records to be played upon said instrument, comprising a plurality of electrical push-buttons, one for each of said records, for selectively initiating the playing of a desired record, and one for stopping such playing, at will.

37. The combination, with an automatic musical instrument having note-sounding devices and means for actuating them, of a multicolored controller for controlling the operation of said actuating means, comprising means for supporting a plurality of records, controllable selecting means for registering and effecting the selection of any one of said plurality of records for playing upon said instrument, means for propelling a selected record, and controllable rewinding means for rewinding said record, and manually controllable means connected with said controller for selectively causing any desired one or more of said records to be played upon said instrument, comprising manually controllable means connected with said selecting means for registering the selection of one or more of said plurality of records and effecting the propelling of the first selected record by said propelling means, and other manually controllable means connected with said rewinding means for stopping such propelling, at will, and immediately effecting the rewinding of said first selected record, whereupon, at the end of such rewinding, the propelling of another selected record will automatically begin.

38. The combination, with an automatic musical instrument having note-sounding devices, pneumatically operable means for actuating them, and an air-pump for supplying pneumatic power for operating said actuating means, of a device for controlling the operation of said actuating means and said air-pump, comprising means for supporting and propelling a record, and means separate from said controlling device but connected therewith for controlling the operation thereof and thereby controlling the operation of said air-pump.

39. The combination, with an automatic musical instrument having note-sounding devices, pneumatically operable means for actuating them, and an air-pump for supplying pneumatic power for operating said actuating means, of a device separate from said instrument but connected therewith for controlling the operation of said actuating means and said air-pump, comprising means for supporting and propelling a record, and means separate from said controlling device but connected therewith for controlling the operation thereof and thereby controlling the operation of said air-pump.

40. The combination, with an automatic musical instrument having note-sounding devices, pneumatically operable means for actuating them, and an air-pump for supplying pneumatic power for operating said actuating means, of a multirecord controller separate from said instrument but connected therewith for controlling the operation of said actuating means and said air-pump, comprising means for supporting a plurality of separately removable records and means for propelling any selected one of said records, and manually controllable means connected with said controller to effect the starting of said air-pump and selectively cause any desired one of said records to be propelled by said propelling means to effect and control the operation of said actuating means.

41. The combination, with an automatic musical instrument having note-sounding devices, pneumatically operable means for actuating them, and an air-pump for supplying pneumatic power for operating said actuating means, of a multirecord controller for controlling the operation of said actuating means and said air-pump, comprising means for supporting a plurality of separately removable records and means for propelling any selected one of said records, and manually controllable means separate from said controller but connected therewith for controlling the operation thereof and thereby controlling the operation of said air-pump and selectively cause any desired one of said records to be propelled by said propelling means to effect and control the operation of said actuating means.

42. The combination, with an automatic musical instrument having note-sounding devices, pneumatically operable means for actuating them, an air-pump for supplying pneumatic power for operating said actuating means, and means for determining the degree of pneumatic power applicable to the operation of said actuating means, of a device separate from said instrument but connected therewith for controlling the operation of said actuating means, said power determining means, and said air-pump, and comprising means for supporting and propelling a record, and manually operable means separate from said controlling device but connected therewith for controlling the operation thereof and thereby controlling the operation of said air-pump and the playing of said record upon said instrument.

43. The combination, with an automatic musical instrument having note-sounding devices and means for actuating them, of a movable carrier for supporting a plurality of records, controllable means for moving said carrier to bring a desired record into operative position to control the operation of said actuating means, propelling means for propelling a selected record, speed-controlling means for governing said propelling means, a plurality of tempo-controlling devices, one for each of said plurality of records, and means for rendering each of said tempo-controlling devices operative, when its corresponding record is in operative position, to determine the adjustment of said speed-controlling means and thereby provide for predetermined individual adjustment of the tempo of the musical selection represented by each of said records.

44. The combination, with an automatic musical instrument having note-sounding devices and means for actuating them, of a movable carrier for supporting a plurality of records, selecting means for effecting the movement of said carrier to bring a desired record into operative position to control the operation of said actuating means, propelling means movable into and from operative connection with a selected record when it has been brought into operative position, speed-controlling means for governing said propelling means, and a plurality of individually adjustable tempo-determining devices, one for each of said plurality of records, connected for synchronous movement with said carrier, whereby a different one of said devices will be moved into operative relationship with said speed-controlling means as each record is moved into operative position, to individually determine the speed at which each of said records shall be propelled.

45. The combination, with an automatic musical instrument having note-sounding devices and means for actuating them, of a movable carrier having means for supporting a plurality of records, means for moving said carrier to bring a desired one of said records into operative position to control the operation of said actuating means, and selective means for controlling the movement and stopping of said carrier to determine which of said records shall be brought into operative position; said selective means comprising an abutment-member movable with said carrier and having a plurality of abutments, one for each of said record-supporting means, a plurality of separately operable dogs, each selectively movable into the path of movement of one of said abutments; and a stopping member common to all of said dogs and operable thereby to effect the stopping of said carrier and said abutment-member; the relative positions of said dogs and said abutments being such that, upon the movement of one of said dogs into the path of movement of one of said abutments, the movement of said movable abutment-member will effect the operation of said stopping member to effect the stopping of said carrier when a certain one of said records shall have been brought into operative position and, upon the movement of another of said dogs into the path of movement of another of said abutments, the movement of said abutment-member will effect the operation of said stopping member to effect the stopping of said carrier when another one of said records shall have been brought into operative position.

46. The combination, with an automatic musical instrument having note-sounding devices and means for actuating them, of a movable carrier having means for supporting a plurality of records, means for moving said carrier to bring a desired one of said records into operative position to control the operation of said actuating means, and selective means for controlling the movement and stopping of said carrier to determine which of said records shall be brought into operative position; said selective means comprising an abutment-member movable with said carrier and having a plurality of differently positioned abutments, one for each of said record-supporting means; a plurality of separately operable dogs arranged in a line transverse to the direction of movement of said abutments, each of said dogs being selectively movable into the path of movement of one of said abutments; and a stopping member common to all of said dogs and operable by each thereof to effect the stopping of said carrier and said abutment-member; the relative positions of said abutments upon said abutment-member being such that, upon the movement of any one of said dogs into the path of movement of its corresponding abutment, the movement of said abutment-member will effect the operation of said stopping member to effect the stopping of said carrier when a certain one of said records shall have been brought into operative position and, upon the movement of any other one of said dogs into the path of movement of its corresponding abutment, the movement of said abutment-member will effect the operation of said stopping member to effect the stopping of said carrier when a correspondingly different one of said records shall have been brought into operative position.

47. The combination, with an automatic musical instrument having note-sounding devices and means for actuating them, of a movable carrier having means for supporting a plurality of records, means for moving said carrier to bring a desired one of said records into operative position to control the operation of said actuating means, an electric motor for effecting the movement of said carrier moving means, an electric switch in circuit with said motor, means acting with circuit-closing effect upon said switch, a latch for holding said switch open against the action of the last said means, and selective means for releasing said latch and for controlling the stopping of said carrier to determine which of said records shall be brought into operative position; said selective means comprising a plurality of selectively releasable latches, a member common to all of the last said latches and operable by each thereof to effect the release of said switch-holding latch, an abutment-member movable with said carrier and having a plurality of abutments, one for each of said record-supporting means, a plurality of separately operable dogs, each connected with one of said latches and movable into the path of movement of one of said abutments, and a member common to all of said dogs and operable by each thereof to effect the stopping of said carrier and said abutment-member.

48. The combination, with an automatic musical instrument having note-sounding devices, pneumatically operable means for actuating them, an air-pump for supplying pneumatic power for operating said actuating means, and an electric motor for driving said air-pump, of a movable carrier having means for supporting a plurality of records, means for moving said carrier to bring a desired one of said records into operative position to control the operation of said actuating means, an electric switch in circuit with said motor, means acting with circuit-closing effect upon said switch, a latch for holding said switch open against the action of the last said means, and selective means for releasing said latch and for controlling the movement and stopping of said carrier to determine which of said records shall be brought into operative position; said selective means comprising a plurality of selectively releasable latches, a member common to all of the last said latches and operable by each thereof to effect the release of said switch-holding latch, an abutment-member movable with said carrier and having a plurality of abutments, one for each of said record-supporting means; a plurality of separately operable dogs, one for each of said abutments and each movable into and from the path of movement of its respective abutment, the movement of each of said dogs into said path of movement being controlled by one of said selectively releasable latches; and a stopping member common to all of said dogs and operable by each thereof to effect the stopping of said carrier and said abutment-member.

49. The combination, with an automatic musical instrument having note-sounding devices, pneumatically operable means for actuating them, an air-pump for supplying pneumatic power for operating said actuating means, and an electric motor for driving said air-pump, of a movable carrier having means for supporting a plurality of records, means for moving said carrier to bring a desired one of said records into operative position to control the operation of said actuating means, propelling means for propelling a selected record, an electric motor for effecting the movement of said carrier-moving means and said propelling means, an electric switch in circuit with both of said motors, means acting with circuit-closing effect upon said switch, a latch for holding said switch open against the action of the last said means, and selective means for releasing said latch and for controlling the stopping of said carrier to determine which of said records shall be brought into operative position and propelled by said propelling means; said selective means comprising a plurality of selectively releasable latches, a member common to all of the last said latches and operable by each thereof to effect the release of said switch-holding latch, an abutment-member movable with said carrier and having a plurality of abutments, one for each of said record-supporting means, a plurality of separately operable dogs, each connected with one of said latches and movable into the path of movement of one of said abutments, and a member common to all of said dogs and operable by each thereof to effect the stopping of said carrier and said abutment-member.

50. The combination, with an automatic musical instrument having note-sounding devices and means for actuating them, of a movable carrier having means for supporting a plurality of records, means for moving said carrier to bring a desired one of said records into operative position to control the operation of said actuating means, and selective means for controlling the movement and stopping of said carrier to determine which of said records shall be brought into operative position; said selective means comprising an abutment-member movable with said carrier and having a plurality of abutments, one for each of said record-supporting means; a plurality of separately operable dogs, each selectively movable into the path of movement of one of said abutments; means co-operating with each of said dogs to effect their separate withdrawal from said path of movement; and a stopping member common to all of said dogs and operable thereby to effect the stopping of said carrier and said abutment-member; whereby, upon the selective movement of each of said dogs into the path of movement of its respective abutment, the movement of said abutment-member will effect the operation of said stopping member to effect the stopping of said carrier and said abutment-member and whereby, upon the completion of such operation of said stopping member, the dog effecting such movement will have been withdrawn from the aforesaid path of movement into which it had been selectively moved.

51. The combination, with an automatic musical instrument having note-sounding devices and means for actuating them, of a movable carrier having means for supporting a plurality of records, means for moving said carrier to bring a desired one of said records into operative position to control the operation of said actuating means, and selective means for controlling the movement and stopping of said carrier to determine which of said records shall be brought into operative position; said selective means comprising a plurality of selectively releasable latches, an abutment-member movable with said carrier and having a plurality of abutments, one for each of said record-supporting means, a plurality of separately operable dogs, one for each of said abutments and each movable into and from the path of movement of its respective abutment, the movement of each of said dogs into said path of movement being controlled by one of said selectively releasable latches, means cooperating with each of said dogs to effect their separate withdrawal from said path of movement, and a stopping member common to all of said dogs and operable thereby to effect the stopping of said carrier and said abutment-member; whereby the selective release of one of said latches will effect the movement of a corresponding one of said dogs into the path of movement of its respective abutment, and the movement of said abutment-member will cause said respective abutment to operate said one of said dogs and thereby effect the operation of said stopping member and the stopping of said carrier and said abutment-member, and whereby, upon such stopping of said abutment-member, said one of said dogs will have been withdrawn from the aforesaid path of movement into which it had been selectively moved.

52. The combination, with an automatic musical instrument having note-sounding devices and means for actuating them, of a movable carrier having means for supporting a plurality of records, means for moving said carrier to bring a desired one of said records into operative position to control the operation of said actuating means, and selective means for controlling the movement and stopping of said carrier to determine which of said records shall be brought into operative position; said selective means comprising a plurality of selectively releasable latches, an abutment-member movable with said carrier and having a plurality of abutments, one for each of said record-supporting means, a plurality of separately operable dogs, one for each of said abutments, each connected for alternate movement in reverse directions with one of said latches and movable thereby into the path of movement of one of said abutments, means cooperating with each of said dogs to effect their separate withdrawal from said path of movement, and a stopping member common to all of said dogs and operable thereby to effect the stopping of said carrier and said abutment-member; whereby the selective release of one of said latches will effect the movement of the dog connected therewith into the path of movement of its respective abutment, and the movement of said abutment-member will cause said respective abutment to operate said dog and thereby effect the operation of said stopping member and the stopping of said carrier and said abutment-member, and whereby, upon such stopping of said abutment-member, said dog will have been withdrawn from the aforesaid path of movement and such withdrawal of said dog will have effected the restoration of the latch connected therewith to latched position.

53. The combination, with an automatic musical instrument having note-sounding devices and means for actuating them, of a movable carrier having means for supporting a plurality of records, means for moving said carrier to bring a desired one of said records into operative position to control the operation of said actuating means, an electric switch, means acting upon said switch to close it, a latch for holding said switch open against the action of said switch-closing means, and selective means for releasing said latch and for controlling the movement and stopping of said carrier to determine which of said records shall be brought into operative position; said selective means comprising a plurality of selectively releasable latches, an abutment-member movable with said carrier and having a plurality of abutments, one for each of said record-supporting means, a plurality of separately operable dogs, one for each of said abutments and each connected with one of said selectively releasable latches for movement thereby into the path of movement of its respective abutment, a member common to all of said selectively releasable latches and operable by each thereof to effect the release of said switch-holding latch, means for re-setting said switch-holding latch, an electric motor in circuit with said switch for operating said carrier-moving means and said re-setting means, and a stopping member common to all of said dogs and operable thereby to effect the stopping of said carrier and said abutment-member and for effecting the operation of said latch-re-setting means by said motor; whereby, the release of one of said selectively releasable latches will effect the release of said switch-holding latch and the movement of one of said dogs into the path of movement of one of said abutments, said switch-closing means will operate to close said electric switch and effect the operation of said motor to move said carrier and said abutment-member, the movement of said abutment-member will cause the operation of said one of said dogs and said stopping member to effect the stopping of said carrier and said abutment-member and the re-setting of said switch-holding latch.

54. The combination, with an automatic musical instrument having note-sounding devices and means for actuating them, of a multi-record controller for controlling the operation of said instrument comprising a cabinet separate from said instrument and provided with means for supporting a plurality of records and for propelling any selected one thereof, and a connection extending between said instrument and said cabinet through which the operation of said actuating means may be controlled from any one of the records supported and propelled by said record supporting and propelling means.

In witness whereof, I have hereunto subscribed my name.

CLIFFORD H. GREEN.